(12) United States Patent
Nishida et al.

(10) Patent No.: US 7,545,785 B2
(45) Date of Patent: Jun. 9, 2009

(54) MOBILE COMMUNICATION SYSTEM, ACCESS ROUTER, MANAGEMENT DEVICE AND MOBILE COMMUNICATION METHOD

(75) Inventors: Katsutoshi Nishida, Yokohama (JP); Shinichi Isobe, Yokosuka (JP); Takatoshi Okagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 187 days.

(21) Appl. No.: 11/146,330

(22) Filed: Jun. 7, 2005

(65) Prior Publication Data

US 2005/0271015 A1 Dec. 8, 2005

(30) Foreign Application Priority Data

Jun. 8, 2004 (JP) .............................. 2004-170477

(51) Int. Cl.
*H04W 4/00* (2009.01)
(52) U.S. Cl. .................. 370/338; 370/331; 370/349
(58) Field of Classification Search .............. 370/331, 370/338, 349
See application file for complete search history.

(56) References Cited

U.S. PATENT DOCUMENTS

| 6,930,988 | B2 * | 8/2005 | Koodli et al. ................ 370/331 |
| 7,248,591 | B2 * | 7/2007 | Hamamoto et al. .......... 370/401 |
| 2002/0168959 | A1 * | 11/2002 | Noguchi et al. .............. 455/405 |
| 2002/0172207 | A1 * | 11/2002 | Saito et al. ................... 370/400 |
| 2003/0142650 | A1 | 7/2003 | Fan |
| 2003/0193912 | A1 * | 10/2003 | O'Neill ........................ 370/331 |
| 2003/0225892 | A1 * | 12/2003 | Takusagawa et al. ......... 709/227 |
| 2004/0109452 | A1 * | 6/2004 | Takihiro et al. .............. 370/392 |
| 2004/0264465 | A1 * | 12/2004 | Dunk ........................... 370/392 |
| 2005/0271015 | A1 | 12/2005 | Nishida et al. |
| 2006/0274693 | A1 * | 12/2006 | Nikander et al. ............. 370/331 |

FOREIGN PATENT DOCUMENTS

CN 1467959 A 1/2004

OTHER PUBLICATIONS

U.S. Appl. No. 11/218,760, filed Sep. 6, 2005, Isobe et al.
Takatoshi Okagawa, et al., "IP Packet Routing Mechanism Based on Mobility Management in IP-based IMT Network Platform", 8TH International Conference on Intelligence in Next Generation Networks, Apr. 2003, 6 Pages.
Katsutoshi Nishida, et al., "A Proposal for Interconnecting IP$^2$ and Existing IP Networks", The Society Conference of the Institute of Electronics, Information and Communication, Sep. 2003, 1 Page.
"Mobility Support in IPv6", IEFT Mobile IP Working Group Internet-Draft, Draft-IETF-MobileIP-IPV6-24.TXT, Jun. 30, 2003, p. 1-113.

* cited by examiner

*Primary Examiner*—Nay A Maung
*Assistant Examiner*—Tuan H Nguyen
(74) *Attorney, Agent, or Firm*—Oblon, Spivak, McClelland, Maier & Neustadt, P.C.

(57) ABSTRACT

A mobile communication system comprises an access router configured to assign a routing address to a transient address when receiving a user data packet including the transient address is set to a source address from a mobile terminal connecting to the access router and store a correspondence between the transient address and the routing address, and a management device configured to judge whether or not a handover is carried out by judging whether or not an existing routing address assigned to the mobile terminal by other access router than the access router to which the mobile terminal connects exists, based on a unique identifier of the mobile terminal.

6 Claims, 24 Drawing Sheets

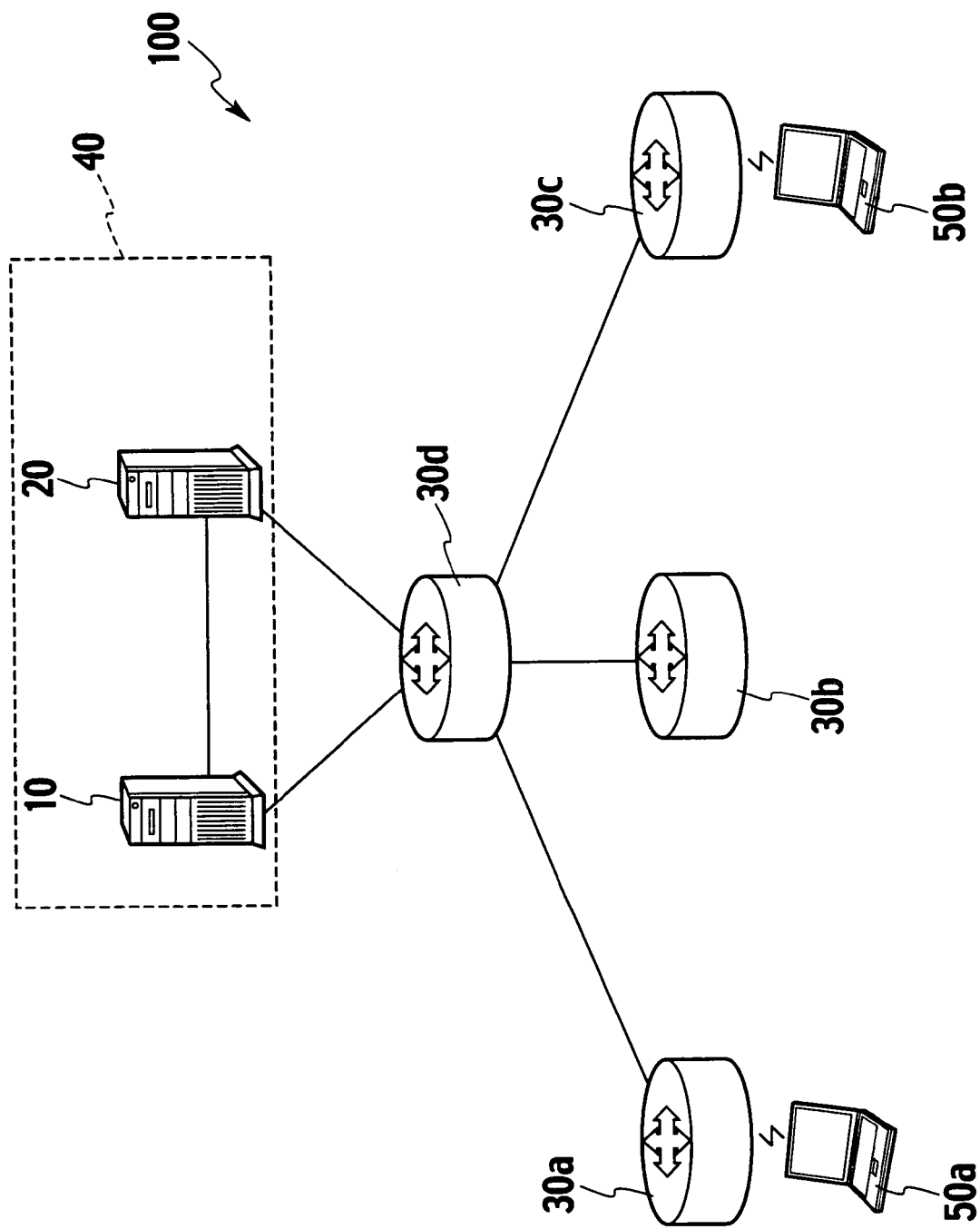

FIG.6

| USER ADDRESS | ROUTING ADDRESS | ACCESS ROUTER ADDRESS | OPTION INFORMATION |
|---|---|---|---|
| UA1 | RA1 | ARA1 | CORRESPONDENT : UA2 |
| UA2 | RA2 | ARA2 | CORRESPONDENT : UA1 |
| UA3 | RA3 | ARA3 | CORRESPONDENT : UA4 |
| UA4 | RA4 | ARA4 | CORRESPONDENT : UA3 |

FIG.7

| USER ADDRESS | UNIQUE IDENTIFIER | ACCESS ROUTER ADDRESS | OPTION INFORMATION |
|---|---|---|---|
| UA1 | a | ARA1 | |
| UA2 | b | ARA2 | |
| UA3 | c | ARA3 | |
| UA4 | d | ARA4 | |

FIG.8

| USER ADDRESS | ROUTING ADDRESS | VALID TERM | OPTION INFORMATION |
|---|---|---|---|
| UA1 | RA1 | 20 | |
| UA2 | RA2 | 30 | |
| UA3 | RA3 | 40 | |
| UA4 | RA4 | 50 | |

FIG.9A
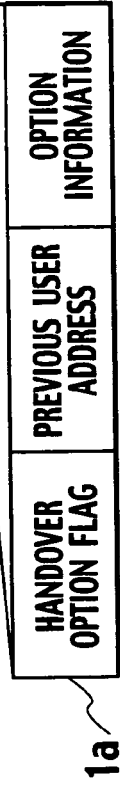
FIG.9B
FIG.9C
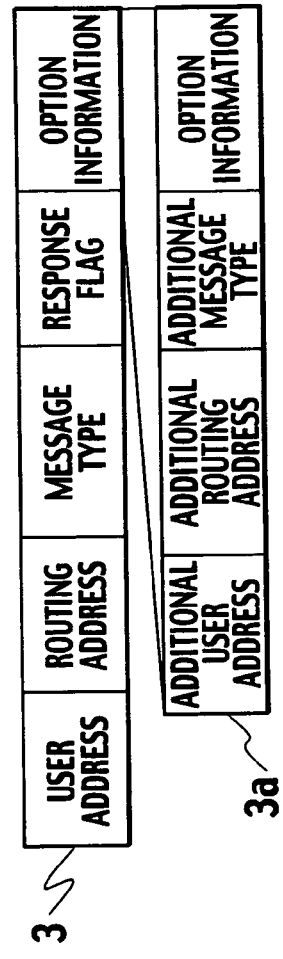
FIG.9D
FIG.9E

MOBILE COMMUNICATION SYSTEM, ACCESS ROUTER, MANAGEMENT DEVICE AND MOBILE COMMUNICATION METHOD

CROSS REFERENCE TO RELATED APPLICATIONS

This application is based upon and claims the benefit of priority from prior Japanese Patent Application No. 2004-170477, filed on Jun. 8, 2004; the entire contents of which are incorporated herein by reference.

BACKGROUND OF THE INVENTION

1. Field of the Invention

The present invention relates to a mobile communication system, an access router, a management device, and a mobile communication method.

2. Description of the Related Art

Recently, a mobile communication system using a user address retained by a communication terminal and a routing address assigned on a network besides the user address in order to transfer a packet has been under discussion (see, for example, Japanese Patent Application Laid-Open No 2004-112727 and Takatoshi okagawa, et. al., "IP Packet Routing Mechanism Based on Mobility Management in IP-based IMT Network Platform", 8th International Conference on Intelligence in next generation Networks, April 2003, hereinafter, referred to as a "document 1").

Hereinafter, the mobile communication system using a user address and a routing address is referred to as a "core-network proxy network system". Further, the core-network proxy network system has been proposed in which a border router provided at the boundary with an external network assigns a routing address to a mobile terminal that has transmitted a packet and exists in the external network when receiving the packet from the mobile terminal (see, for example, Katsutoshi Nishida, Takatoshi Okagawa, "A Proposal for Interconnecting IP 2 and Exiting IP Networks", The Society Conference of the Institute of Electronics, Information and Communication, September 2003, hereinafter, referred to as a "document 2").

On the other hand, the mobile IP has been proposed as a technique for ensuring mobility in a mobile communication system (see, for example, "Mobility Support in IPv6", draft-ietf-mobileip-ipv6-24.txt, June, 2003). Specifically, an MIP terminal (Mobile IP terminal) equipped with a mobile IP technique uses a home address (hereinafter, referred to as a "HoA") assigned in a home link, and a care of address (hereinafter, referred to as a "CoA") acquired on in an external link. Then, a home agent (hereinafter, referred to as an "HA") arranged in the home link manages the HoA and the CoA and transfers a packet to the MIP terminal even if the MIP terminal has moved to the external link

SUMMARY OF THE INVENTION

However, in an attempt to apply the above-mentioned mobile IP technique to the core-network proxy network system described above, it has been found that the following first problem arises. FIG. 1 shows a situation in which an MIP terminal 250 has moved from an external network to a core-network proxy network system consisting of an address management device 210, access routers 230a to 230c, and a router 230d and has connected to the access router 230b. The address management device 210 stores a correspondence between a user address and a routing address (hereinafter, referred to as an "address translation information").

In the core-network proxy network system described in document 1, before the MIP terminal transmits a packet to the access router 230b, it is necessary to request the access router 230b to assign a routing address. Therefore, if the MIP terminal 250 is not equipped with a function of requesting an assignment, it cannot get the access router 230b to assign a routing address. Even if the MIP terminal 250 transmits a packet 201 to the access router 230b using a CoA (#101), the access router 230b judges that the packet 201 from the MIP terminal 250, to which no routing address has been assigned, is an unauthorized packet, and discards it. Therefore, the MIP terminal 250 cannot have the packet 201 transferred.

Here, in an attempt to let the access routers 230a to 230c have the function of the border router shown in document 2 in order to make it possible for the core-network proxy network to accommodate the MIP terminal 250 not equipped with the function of requesting an assignment, it has been found that the following second problem arises.

As shown in FIG. 2, the MIP terminal 250 generates the CoA (#101), sets it to a source address, and transmits the packet 201. The access router 230b receives the packet 201 from the MIP terminal 250, regards the CoA (#101) as the user address of the MIP terminal 250, and assigns a routing address (#20) to the CoA (#101). Then, the access router 230b notifies the address management device 210 of a correspondence between the CoA (#101) and the routing address (#20) (address translation information). Due to this, the address translation information of the MIP terminal 250 is registered in the address management device 210, so the MIP terminal 250 cannot get the packet 201 transferred.

However, when the MIP terminal 250 carries out a handover from one access router to another and connects to the other access router 230c, it newly generates a CoA (#201). Then, the access router 230c receives the packet 201 in which the CoA (#201) has been set to the source address from the MIP terminal 250 and assigns a new routing address (#30) to the CoA (#201). The access router 230c notifies the address management device 210 of a correspondence between the CoA (#201) and the routing address (#30) (address translation information).

The address management device 210 manages the address translation information using the user address. Because of this, the address management device 210 manages the address translation information using the care-of address. As a result, the address management device 210 cannot recognize that the care-of addresses and the routing addresses before and after the handover belong to the same mobile terminal 250 when the care-of address is changed into a new care-of address through the handover to which a routing address is assigned. In other words, the address management device 210 cannot detect the occurrence of a handover.

Therefore, for example, the address management device 210 and the access router 230b before the handover cannot delete the address translation information of the MIP terminal 250 before the handover, which is no longer necessary because of the handover, and continue to store it. As a result, the address management device 210 and the access router 230b waste the storage capacity by continuing to store useless information.

An object of the present invention is to make it possible to transfer a user data packet using a routing address and to detect a handover even when the address used temporarily (hereinafter, referred to as a "transient address") such as a care-of address is used as a user address.

A mobile communication system according to an embodiment of the present invention includes an access router configured to assign a routing address to a transient address when receiving a user data packet including the transient address is set to a source address from a mobile terminal connecting to the access router and store a correspondence between the transient address and the routing address, and a management device configured to judge whether or not a handover is carried out by judging whether or not an existing routing address assigned to the mobile terminal by other access router than the access router to which the mobile terminal connects exists, based on a unique identifier of the mobile terminal.

According to such a mobile communication system, even when the transient address is used as a user address, the access router can assign a routing address to the transient address to transfer the user data packet. Further, by using the unique identifier, it is possible for the management device to uniquely identify the mobile terminal even if the transient address changes through the handover and to detect that the handover is carried out based on the existence or nonexistence of the existing routing address of the identified mobile terminal.

An access router according to an embodiment of the present invention includes an assignment unit configured to assign a routing address to a transient address when receiving a user data packet including the transient address is set to a source address from a mobile terminal connecting to the access router, a translation information storage unit configured to store a correspondence between the transient address the and the routing address, and a translation information management unit configured to register the correspondence in the translation information storage unit. According to such an access router, even when the transient address is used as a user address, it is possible to transfer the user data packet by assigning a routing address to the transient address.

A management device according to an embodiment of the present invention includes a judgment unit configured to judge whether or not a handover is carried out by judging whether or not an existing routing address assigned to a mobile terminal by other access router than an access router to which the mobile terminal connects exists, based on a unique identifier of the mobile terminal. According to such a management device, it is possible to uniquely identify the mobile terminal even if the transient address changes through the handover and to detect the handover based on the existence or nonexistence of the existing routing address of the identified mobile terminal by using the unique identifier.

A mobile communication method according to an embodiment of the present invention includes assigning a routing address to a transient address when receiving a user data packet including the transient address is set to a source address from a mobile terminal connecting to an access router, registering a correspondence between the transient address and the routing address in a translation information storage unit configured to store the correspondence, and judging whether or not a handover is carried out by judging whether or not an existing routing address assigned to the mobile terminal by other access router than the access router to which the mobile terminal connects exists, based on a unique identifier of the mobile terminal.

BRIEF DESCRIPTION OF THE DRAWINGS

FIG. 3 is a block diagram showing a mobile communication system according to an embodiment of the present invention.

FIG. 6 is a diagram showing an address management table according to an embodiment of the present invention.

FIG. 7 is a diagram showing a terminal management table according to an embodiment of the present invention.

FIG. 8 is a diagram showing a translation information table according to an embodiment of the present invention.

FIG. 9A to FIG. 9E are diagrams each showing a message according to an embodiment of the present invention.

Figure 1:
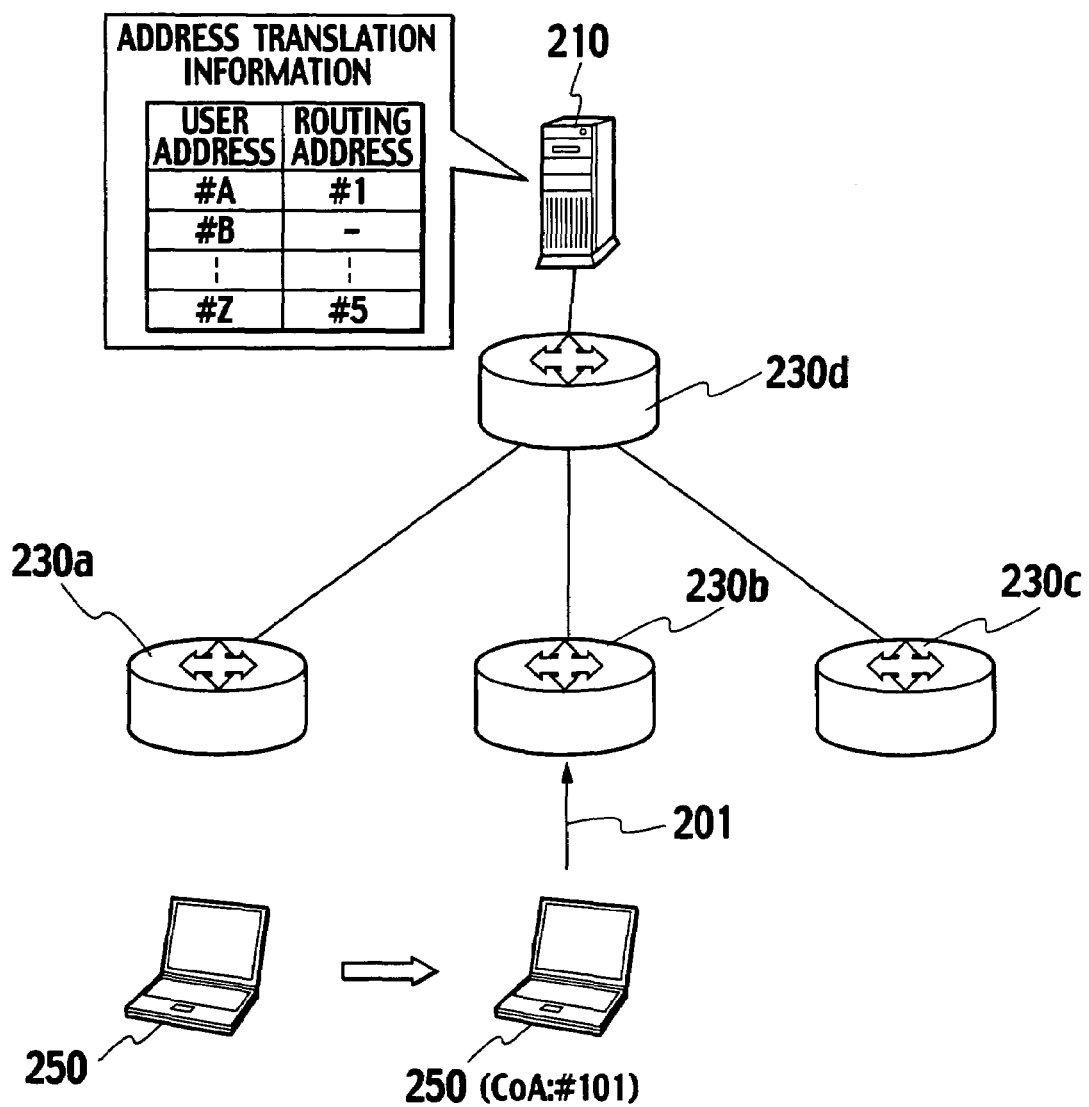
FIG. 1 is a diagram for explaining the first problem.
Figure 2:
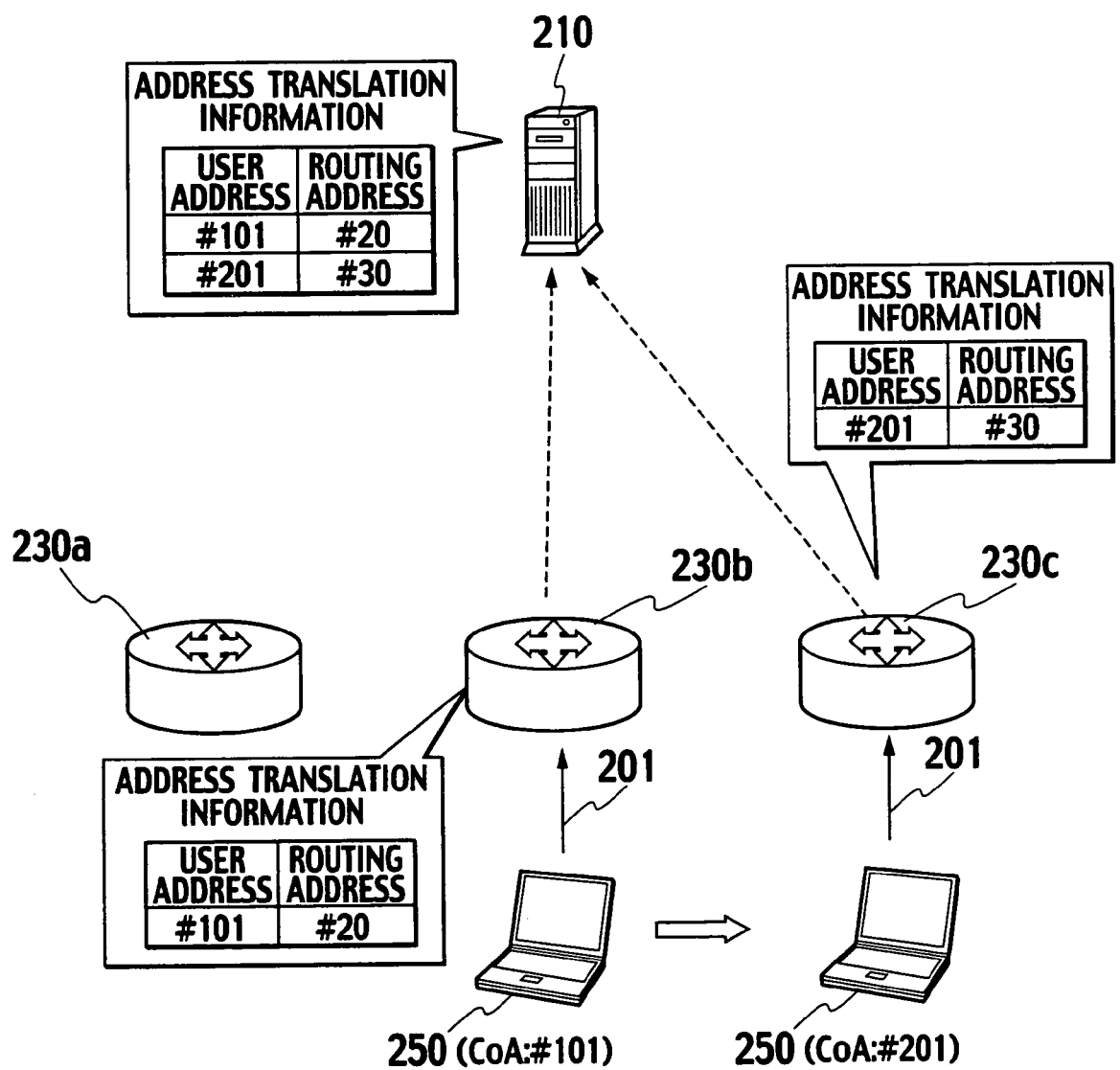
FIG. 2 is a diagram for explaining the second problem.

DETAILED DESCRIPTION OF THE EMBODIMENTS (Mobile communication system)

As shown in FIG. 3, a mobile communication system 100 includes a management device 40, plural access routers 30a to 30c, a router 30d, a mobile IP terminal (hereinafter, referred to as an "MIP terminal") 50a, and a corresponding terminal 50b.

The mobile communication system 100 uses user addresses of the MIP terminal 50a and the corresponding terminal 50b, and routing addresses. In other words, the mobile communication system 100 is a core-network proxy network system. The routing address is an address used for transferring a packet in the mobile communication system 100 and is assigned to the user address by the access router.

Figure 4A:
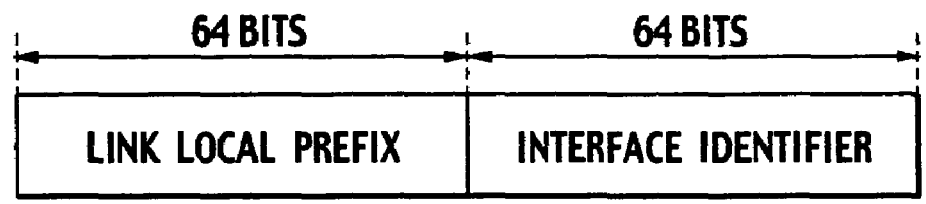
FIG. 4A and FIG. 4B are diagrams each showing a user address according to an embodiment of the present invention.
Figure 4B:
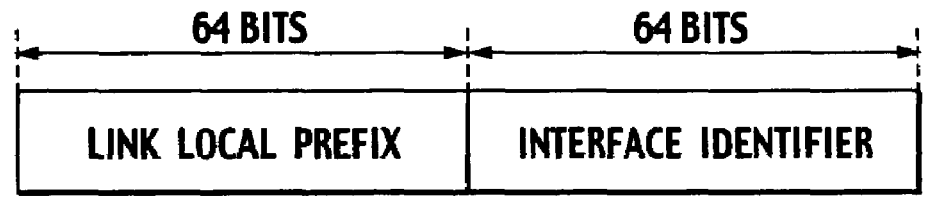

The user addresses include a link local address shown in FIG. 4A and a care-of address shown in FIG. 4B. The link local address is generated using a 64-bit fixed value called a link local prefix, and a 64-bit interface identifier unique to each interface of the MIP terminal 50a and the corresponding terminal 50b. The care-of address differs from access router to access router and is generated using a 64-bit global prefix that changes depending on the access router to which the terminal connects and the interface identifier. For example, the interface identifier and the generation of an address are described in detail in "IPv6 Stateless Address Autoconfiguration", IETF RFC2462, "IP version 6 Addressing Architecture", IETF, RFC2373 and the like.

The care-of address changes depending on the access router to which the MIP terminal 50a connects. Therefore, for example, the care-of address generated when the MIP terminal 50a connects to the access router 30a is temporarily used while the MIP terminal 50a connects to the access router 30a. The address such as a care-of address, which is temporarily used, is referred to as a "transient address". The interface identifier and the link local address are unique to a communication terminal connecting to an access router and generating an address, and can be used as a unique identifier for uniquely identifying the communication terminal in the mobile communication system 100. A correspondence between a user address and a routing address is referred to as "address translation information", hereinafter.

The MIP terminal 50a is a mobile terminal. The MIP terminal 50a has a mobile IP function. The corresponding terminal 50b is a correspondent of the MIP terminal 50a and a communication terminal such as a mobile terminal or a fixed terminal. The MIP terminal 50a and the corresponding terminal 50b are connected to any one of access routers 30a to 30c. The MIP terminal 50a performs the generation of a link local address and a care-of address, the transmission and reception of a packet, and the like. The packet that the MIP terminal 50a and the corresponding terminal 50b transmit is particularly referred to as a user packet. The user packets include a user data packet including user data, a user control packet including user control data, and the like.

The management device 40 controls an access router. Specifically, the management device 40 performs an address management and a terminal management. The management device 40 includes an address management device 10 for performing an address management and a roaming terminal management device 20 for performing a terminal management. Specifically, as an address management, the address management device 10 stores address translation information and instructs the access routers 30a to 30c to register, update, and delete the address translation information. Further, the address management device 10 performs an address resolution in accordance with the request of the access routers 30a to 30c.

Specifically, as a terminal management, the roaming terminal management device 20 stores terminal information about the MIP terminal 50a and the corresponding terminal 50b. Further, the roaming terminal management device 20 judges whether or not a handover is carried out (hereinafter, referred to as a "handover judgment") by judging whether or not a routing address (hereinafter, referred to as an "existing routing address") already assigned to the MIP terminal 50a by other access router than the access router to which the MIP terminal 50a connects exists, based on the unique identifier of the MIP terminal 50a. Furthermore, the roaming terminal management device 20 judges whether or not the unique identifier and the unique identifier (hereinafter, referred to as an "existing unique identifier") of an existing terminal which connects to other access router are the same (hereinafter, referred to as an "identifier duplication judgment"), and notifies the access router of the judgment result of the identifier duplication judgment. By the way, the existing terminals include, for example, a communication terminal originally present in the mobile communication system 100, an MIP terminal that has arrived at the mobile communication system 100 earlier than the MIP terminal 50a, and the like.

The access routers 30a to 30c assign a routing address to a care-of address (transient address) when receiving the user data packet including the care-of address (transient address) is set to a source address from the MIP terminal 50a connecting thereto, and stores the correspondence between the care-of address and the routing address as address translation information. Further, the access routers 30a to 30c transfer the user data packet based on the address translation information. The router 30d transfers a packet transmitted and received among the access routers 30a to 30c, the address management device 10, and the roaming terminal management device 20, and connects the access routers 30a to 30c, the address management device 10, and the roaming terminal management device 20.

Figure 5:
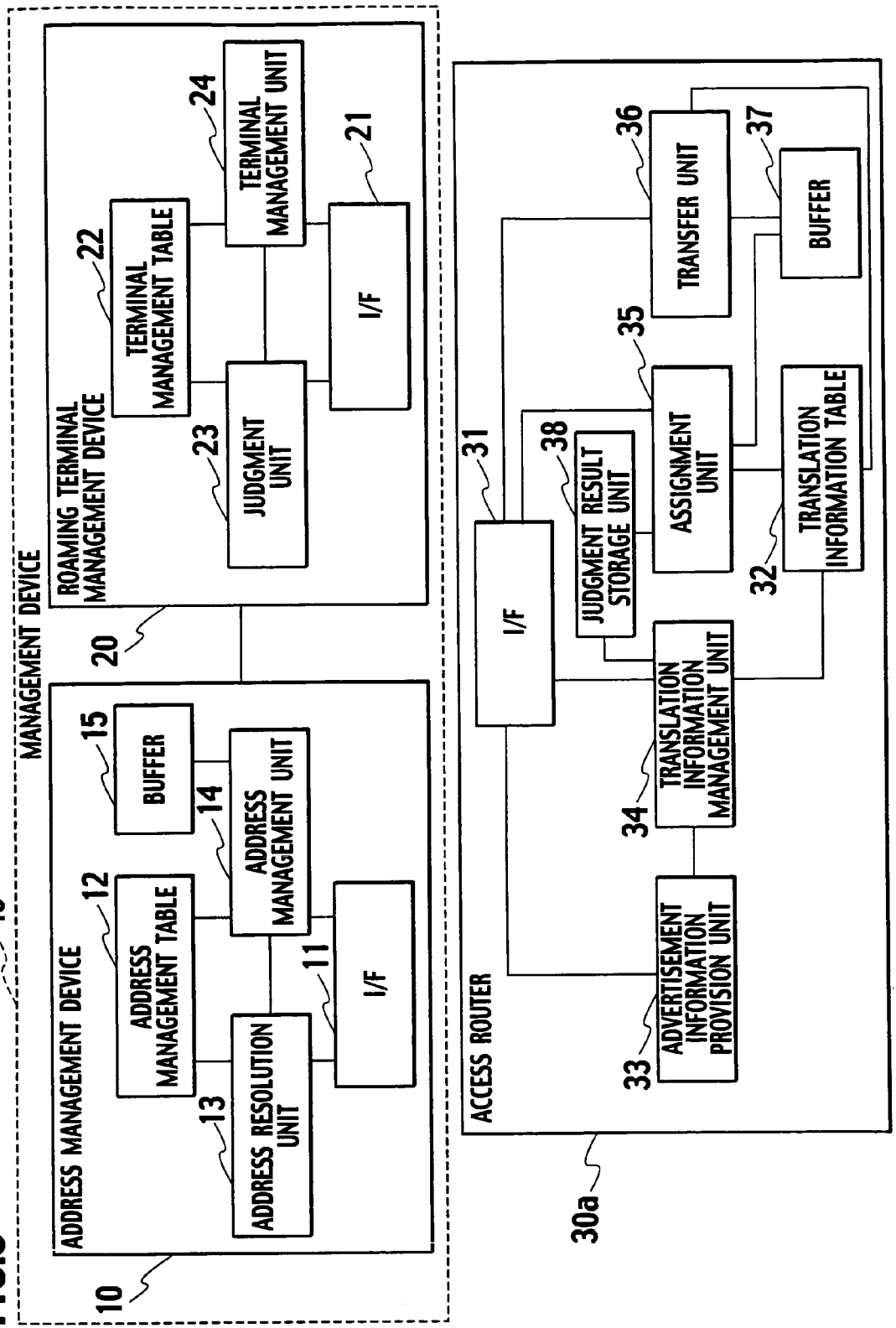
FIG. 5 is a block diagram showing a management device and an access router according to an embodiment of the present invention.

Next, the configurations of the address management device 10, the roaming terminal management device 20, and the access routers 30a to 30c are explained below using FIG. 5. The address management device 10 includes an interface (hereinafter, referred to as an "I/F") 11, an address management table 12, an address resolution unit 13, an address management unit 14, and a buffer 15. The I/F 11 transmits and receives a packet.

The address management table 12 is an address information storage unit configured to store a correspondence between a care-of address (transient address) and a routing address assigned to the care-of address (transient address) by the access routers 30a to 30c as address translation information. As shown in FIG. 6, the address management table 12 includes the fields of a user address such as a care-of address and a link local address, a routing address, an address of the access router (hereinafter, referred to as an "access router address") to which the MIP terminal 50a and the corresponding terminal 50*b* connect, and other additional information (hereinafter, referred to as "option information"). As described above, the address management table 12 can store the access router address and the option information, in addition to the address translation information.

The address resolution unit 13 acquires a routing address from the address management table 12 in response to the request of the routing address corresponding to the user address such as a care-of address (transient address) from the access routers 30*a* to 30*c* and notifies the access routers 30*a* to 30*c* of the routing address. The address resolution unit 13 acquires a corresponding routing address by retrieving the address management table 12 based on the user address, and notifies the access routers 30*a* to 30*c* of the routing address. According to the address management device 10 as described above, it is possible to manage the address translation information and to notify the access routers 30*a* to 30*c* of it, therefore, the access routers 30*a* to 30*c* have only to store the necessary address translation information when in need of it. Due to this, it is possible to prevent the waste of the storage capacity of the access routers 30*a* to 30*c* and to effectively utilize the resource of the mobile communication system 100.

The address management unit 14 instructs the access routers 30*a* to 30*c* to register, update, and delete the address translation information. Further, the address management unit 14 registers, updates, and deletes the address translation information and the like of the address management table 12. The address management unit 14 registers the routing address, the access router address, and the option information in the address management table 12 correspondingly with the user address, updates and deletes them. The buffer 15 temporarily stores the address translation information before update when updating the address translation information stored in the address management table 12.

The roaming terminal management device 20 includes an I/F 21, a terminal management table 22, a judgment unit 23, and a terminal management unit 24. The I/F 21 transmits and receives a packet The terminal management table 22 is a terminal information storage unit configured to store terminal information about the MIP terminal 50*a* and the corresponding terminal 50*b*, which connect to the access routers 30*a* to 3*c*, and to which a routing address is assigned. As shown in FIG. 7, the terminal management table 22 includes the fields of the user address such as a care-of address and a link local address, a unique identifier such as an interface identifier and a link local address, an access router address, and option information. As described above, the terminal management table 22 can store the user address, the unique identifier, the access router address, and the option information as terminal information. Further, the roaming terminal management device 20 manages the terminal information using the unique identifier as a key.

The judgment unit 23 makes a handover judgment for judging whether or not a handover is carried out by judging whether or not the existing routing address already assigned to the MIP terminal 50*a* by other access router than the access router to which the MIP terminal 50*a* connects exists, based on the unique identifier of the MIP terminal 50*a* In other words, the judgment unit 23 judges whether or not the MIP terminal 50*a* has carried out a handover. Further, the judgment unit 23 makes an identifier duplication judgment for judging whether or not the unique identifier of the MIP terminal 50*a* and the existing unique identifier of the existing terminal that has already connected to other access router are the same.

The judgment unit 23 acquires a care-of address that the MIP terminal 50*a* tries to use from the access router to which the MIP terminal 50*a* has connected. The judgment unit 23 acquires the unique identifier from the acquired care-of address. The judgment unit 23 retrieves the terminal management table 22 based on the acquired unique identifier, and if the same unique identifier does not exist in the terminal management table 22, the judgment unit 23 judges that the existing routing address of the MIP terminal 50*a* does not exist and a handover has not been carried out, and that the unique identifier of the MIP terminal 50*a* differs from the existing unique identifier and can be uniquely identified in the mobile communication system 100.

When the same unique identifier exists in the terminal management table 22, the judgment unit 23 judges whether the existing routing address of the MIP terminal 50*a* exists and a handover has been carried out, or whether the unique identifier of the MIP terminal 50*a* is the same as any one of the existing identifiers and has been duplicated in the mobile communication system 100, by inquiring it of other access routers. The judgment unit 23 inputs the result of the handover judgment and the result of the identifier duplication judgment into the terminal management unit 24.

The terminal management unit 24 notifies the access routers 30*a* to 30*c* of the result of the identifier duplication judgment made by the judgment unit 23. The terminal management unit 24 instructs the address management device 10 to register, update, and delete the address translation information. The terminal management unit 24 notifies the address management device 10 of the detection of a handover. Further, the terminal management unit 24 registers terminal information and the like in the terminal management table 22. The terminal management unit 24 registers the unique identifier, the access router address, and the option information in the terminal management table 22 correspondingly with the user address.

The access router 30*a* includes an I/F 31, a translation information table 32, an advertisement information provision unit 33, a translation information management unit 34, an assignment unit 35, a transfer unit 36, a buffer 37, and a judgment result storage unit 38. The access routers 30*b* and 30*c* also have the substantially same configuration as that of the access router 30*a*. The I/F 31 transmits and receives a packet. The translation information table 32 is a translation information storage unit configured to store address translation information. As shown in FIG. 8, the translation information table 32 includes the fields of a user address such as a care-of address and a link local address, a routing address, a valid term for an entry of the address translation information, and option information. The valid term is a period during which the address translation information table 32 stores the entry of the address translation information. In this manner, the translation information table 32 can store, in addition to the address translation information, its valid term and option information.

The advertisement information provision unit 33 provides the MIP terminal 50*a* and the corresponding terminal 50*b* connecting to the access router 30*a* with advertisement information from the access router 30*a* The advertisement information provision unit 33 may provide advertisement information periodically or may provide advertisement information in response to the request from the MIP terminal 50*a* and the corresponding terminal 50*b* connecting to the access router 30*a*. The advertisement information includes prefix information such as a global prefix assigned to the access router 30*a*.

The assignment unit 35 assigns a routing address to the care-of address (transient address) when receiving the user data packet including the care-of address (transient address)

is set to a source address from the MIP terminal 50a connecting to the access router 30a When the MIP terminal 50a connects to the access router 30a, if the unique identifier of the MIP terminal 50a differs from the existing unique identifier of the existing terminal connecting to the access routers 30b and 30c other than the access router 30a, the assignment unit 35 assigns a routing address. Further, when the access router 30a encapsulates the user data packet using the routing address and transfers it, the assignment unit 35 assigns the access router address of the access router 30a to which the MIP terminal 50a connects as a routing address.

When the access router 30a receives a user data packet, the assignment unit 35 acquires a user address such as a care-of address and a link local address from the user data packet and stores the user data packet in the buffer 37. The buffer 37 temporarily stores the user data packet. The assignment unit 35 refers to the judgment result storage unit 38 and assigns a routing address to the acquired user address. The assignment unit 35 notifies the roaming terminal management device 20 of the address translation information via the I/F 31. The judgment result storage unit 38 stores a "duplicate identifier confirmation state" indicating that the connection to the mobile communication system 100 of the MIP terminal having the unique identifier is permitted, because the unique identifier differs from the existing unique identifier and is not duplicated in the mobile communication system 100.

The translation information management unit 34 registers the address translation information in the translation information table 32. The translation information management unit 34 registers the routing address, the valid term, and the option information in the translation information table 32 correspondingly with the user address. As to the valid term, for example, a default value can be registered. Further, the translation information management unit 34 deletes and updates the address translation information stored in the translation information table 32. The translation information management unit 34 registers, updates, and deletes the address translation information according to the instruction to register, update, and delete it from the address management unit 10. Further, the translation information management unit 34 monitors the valid term of the translation information table 32 and notifies the address management device 10 of the expiration of the valid term.

The translation information management unit 34 carries out a DAD (duplicate address detection) process for confirming whether the unique identifier of the MIP terminal to connect to the access router 30a is not duplicated in subordination to the access router 30a and can be identified uniquely. Further, the translation information management unit 34 acquires the result of the identifier duplication judgment from the roaming terminal management device 20. The translation information management unit 34 generates a duplicate identifier confirmation state and sets it to the judgment result storage unit 38 only when the judgment result is that there is no duplication.

The transfer unit 36 transfers a user data packet. The transfer unit 36 acquires the user data packet from the buffer 37. The transfer unit 36 retrieves the translation information table 32 based on the user address set to the destination address and the source address of the user data packet, and acquires the assigned routing address. The transfer unit 36 translates the user address of the destination address and the source address into the acquired routing address and transfers the user data packet. By the way, the transfer unit 36 may omit the translation of the source address into the routing address. Further, the transfer unit 36 may encapsulate the user data packet using the acquired routing address and transfer it.

Next, messages used in the mobile communication system 100 are explained using FIG. 9A to FIG. 9E. These messages are transmitted and received as a control packet. In FIG. 9A to FIG. 9E, for simplicity of the explanation, a header including a destination address and a source address necessary to transmit and receive the control packet is omitted.

An entry notification message 1 shown in FIG. 9A is a message for, when the access routers 30a to 30c newly assign a routing address to the user address, notifying the roaming terminal management device 20 and the address management device 10 of the new address translation information. The entry notification message 1 is transmitted, for example, to the roaming terminal management device 20 from the access routers 30a to 30c and transmitted to the address management device 10 from the roaming terminal management device 20. The entry notification message 1 includes the fields of a user address, a routing address assigned to the user address, an access router address, a response request flag, a response flag, and option information.

The response request flag is a flag indicating whether or not a response to the entry notification message 1 is requested, and "On" indicates that a response is requested and "Off" indicates that it is not requested. The response flag is a flag indicating whether or not the entry notification message 1 is a response to any one of the entry notification messages, and "On" indicates a response and "Off" indicates no response.

To the option information field, for example, a handover option 1a can be set The handover option 1a is used in order that the roaming terminal management device 20 notifies the address management device 10 that the MIP terminal 50a is carried out a handover. The handover option 1a includes the fields of a handover option flag that indicates that a handover is detected by setting "On", a previous user address for setting the user address before the handover, and option information.

An address resolution request message 2 shown in FIG. 9B is a message for requesting a routing address corresponding to the user address to the address management device 10 by the access routers 30a to 30c. When the access routers 30a to 30c do not store the address translation information including the destination address of the user data packet received from the subordinate MIP terminal 50a of its own in the translation information table 32, the address resolution request message 2 is transmitted to the address management device 10 in order to acquire the address translation information from the access routers 30a to 30c. The address resolution request message 2 includes the fields of a source user address of a user data packet, a destination user address of the user data packet, and option information.

A register/delete request message 3 shown in FIG. 9C is a message for instructing the access routers 30a to 30c to register, update, and delete the address translation information by the address management device 10. The register/delete request message 3 is transmitted, for example, from the address management device 10 to the access routers 30a to 30c. The register/delete request message 3 includes the fields of a user address that becomes a target of registration and deletion, a routing address assigned to the user address, a message type, a response flag, and option information. The message type indicates whether the register/delete request message 3 is a message for requesting the registration of the address translation information or a message for requesting the deletion thereof. "Register" indicates that it is a message for requesting the registration of the address translation information and "Delete" indicates that it is a message for requesting the deletion of the address translation information.

It is possible to set, for example, a multiple notification option 3a into the option information field. The multiple notification option 3a makes it possible to instruct the registration and deletion of a plurality of pieces of the address translation information with one register/delete request message 3. Therefore, the multiple notification option 3a includes the fields of an additional user address, an additional routing address, an additional message type, and option information so that the address translation information to be additionally notified, and the request as to either of the registration or the deletion thereof can be set.

For example, by setting the message type and the additional message type to "Register", and plural pieces of address translation information to be registered to the fields of the user address, the routing address, the additional address, and the additional routing address, the address management device 10 can instruct to register the plural pieces of address translation information with one register/delete request message 3. Further, by setting the message type to "Register", the address translation information to be registered to the fields of the user address and the routing address, the additional message type to "Delete", and setting the address translation information to be deleted to the fields of the additional user address and the additional routing address, the address management device 10 can instruct to register new address translation information and to delete the previous address translation information with one register/delete request message 3, and can instruct to update the address translation information.

A term expiration notification message 4 shown in FIG. 9D is a message for notifying that the valid term of the entry of the address translation information stored in the translation information table 32 of the access routers 30a to 30c has expired. The term expiration notification message 4 is transmitted, for example, from the access routers 30a to 30c to the roaming terminal management device 20 and from the roaming terminal management device 20 to the address management device 10. The term expiration notification message 4 includes the fields of a user address the valid term of which has expired and option information.

A duplication confirmation message 5 shown in FIG. 9E is a message used for an identifier duplication judgment and an address duplication judgment, and for notifying the result of the identifier duplication judgment. The duplication confirmation message 5 is transmitted and received between each of the access routers 30a to 30c and the roaming terminal management device 20. The duplication confirmation message 5 includes the fields of the care-of address shown in FIG. 4B generated by using an interface identifier, which becomes a target of an identifier duplication judgment, a response type flag, and option information. The response type flag is a flag indicating whether or not a duplication confirmation message 5 is response to any one of the duplication confirmation messages. "Off" indicates no response, "No-duplication flag" indicates a response (a acknowledge) for notifying that the unique identifier is different from the existing unique identifier and is not duplicated, and "Duplication flag" indicates a response (an error response) for notifying that the unique identifier is the same as the existing unique identifier and is duplicated. As information concerning such a unique identifier, the duplication confirmation message 5 including the care-of address generated by using the interface identifier can be used for the access routers 30a to 30c to request the roaming terminal management device 20 to make an identifier duplication judgment.

Next, processes carried out in the mobile communication system 100, that is, processes carried out by the address management device 10, the roaming terminal management device 20, and the access routers 30a to 30c are explained in greater detail. First of all, the process carried out until the MIP terminal 50a moves to the mobile communication system 100, which is a core-network proxy network system, and connects to the access router 30a (roaming-in), and then the address management device 10, the roaming terminal management device 20, and the access router 30a register the address translation information is explained using FIG. 10.

When the MIP terminal 50a connects to the access router 30a, the advertisement information provision unit 33 of the access router 30a transmits advertisement information 6 to the MIP terminal 50a via the I/F 31. Upon receipt of the advertisement information 6, the MIP terminal 50a starts the generation process of the care-of address. The MIP terminal 50a carries out a duplicate address detection (DAD) process for confirming whether the unique identifier such as the interface identifier and the link local address of the MIP terminal 50a is not duplicated in subordination to the access router 30a to which the MIP terminal 50 connects, and whether it can be identified uniquely. The DAD process for confirming whether the unique identifier is duplicated for only subordinates to the access router 30a to which the MIP terminal 50 connects is shown, for example, in RFC2462.

Specifically, the MIP terminal 50a transmits a neighbor solicitation message 7 to the access router 30a by multicast-transmitting the neighbor solicitation message 7 including its own unique identifier in the same link. The I/F 31 of the access router 30a receives the neighbor solicitation message 7 and inputs it into the translation information management unit 34. The translation information management unit 34 acquires an interface identifier from the neighbor solicitation message 7, and generates a care-of address "UA1" expected to be generated by the MIP terminal 50a when the unique identifier of the MIP terminal 50a is not a duplicate of the existing unique identifier, using the interface identifier and the global prefix unique to the access router 30a included in the advertisement information provided by the advertisement information provision unit 33. The translation information management unit 34 retrieves the translation information table 32 based on the generated care-of address "UA1" and confirms whether or not the care-of address "UA1" exists.

When the same care-of address does not exits in the translation information table 32, the translation information management unit 34 sets the care-of address "UA1" expected to be used by the MIP terminal 50a to the field of the care-of address, generates the duplication confirmation message 5 in which "Off" is set to the field of the response type flag, and inputs it into the I/F 31. The I/F 31 transmits the duplication confirmation message 5 generated by the translation information management unit 34 to the roaming terminal management device 20. In this manner, the access router 30a receives the neighbor solicitation message 7 as a request for an identifier duplication judgment from the MIP terminal 50a, and transmits the duplication confirmation message 5 for requesting an identifier duplication judgment of the roaming terminal management device 20 based on the neighbor solicitation message 7.

The I/F 21 of the roaming terminal management device 20 receives the duplication confirmation message 5 from the access router 30a and inputs it into the judgment unit 23. The judgment unit 23 extracts an interface identifier from the care-of address "UA1" set to the duplication confirmation message 5. When the terminal management table 22 stores a link local address as a unique identifier, the judgment unit 23 generates a link local address using the interface identifier. The judgment unit 23 retrieves the terminal management table 22 based on the unique identifier such as the interface identifier or the link local address, and judges whether or not the same unique identifier exits in the terminal management table 22.

When the same unique identifier does not exist, the judgment unit 23 judges that there is no existing routing address of the MIP terminal 50*a*, and the unique identifier of the MIP terminal 50*a*, which connects to the access router for the other reason than a handover, differs from the existing unique identifier and can be identified uniquely in the mobile communication system 100. In this manner, the judgment unit 23 makes a handover judgment and an identifier duplication judgment based on the duplication confirmation message 5 and inputs the judgment results into the terminal management unit 24.

The terminal management unit 24 sets the care-of address "UA1", which is a target of judgment, to the field of the care-of address, generates the duplication confirmation message 5 in which "No-duplication flag" is set to the field of the response type flag, and inputs it into the I/F 21. The I/F 21 transmits the duplication confirmation message 5 to the access router 30*a*. Due to this, the roaming terminal management device 20 permits the connection of the MIP terminal 50*a* to the access router 30*a*.

The I/F 31 of the access router 30*a* receives the duplication confirmation message 5 from the roaming terminal management device 20 and inputs it into the translation information management unit 34. The translation information management unit 34 judges that the unique identifier and the existing unique identifier are different based on the duplication confirmation message 5 in which "No- duplication flag" is set. Then, the translation information management unit 34 generates a duplicate identifier confirmation state and sets it to the judgment result storage unit 38 correspondingly with the care-of address "UA1" generated using the interface identifier confirmed to be not duplicated.

The translation information management unit 34 may set in advance a management device duplication confirmation completion waiting time Y. Then, after sending the duplication confirmation message 5 to the roaming terminal management device 20, if there is no response from the roaming terminal management device 20 even when the management device duplication confirmation completion waiting time Y has elapsed, the translation information management unit 34 may judge that the unique identifier and the existing unique identifier are different. Due to this, the roaming terminal management device 20 can omit the response to the duplication confirmation message 5.

As described above, in the mobile communication system 100, the DAD process of confirming whether or not the unique identifier has been duplicated, for subordinates to the access router 30*a* to which the MIP terminal 50*a* connects, is extended to other access routers than the access router 30*a* to which the MIP terminal 50*a* connects. Specifically, the access router 30*a* transmits the duplication confirmation message 5 to the roaming terminal management device 20 that manages the terminal information of the entire mobile communication system 100, and the roaming terminal management device 20 judges whether the unique identifier of the MIP terminal 50*a* can be identified uniquely in the mobile communication system 100 based on the duplication confirmation message 5. In this manner, the roaming terminal management device 20 can make an identifier duplication judgment extended to the other routers by cooperating with the access router 30*a*. Further, the MIP terminal 50*a* itself can confirm the uniqueness of the unique identifier of the MIP terminal 50*a* in the mobile communication system 100 without adding a specific function only by transmitting the neighbor solicitation message 7 as in the normal DAD process.

Figure 10:
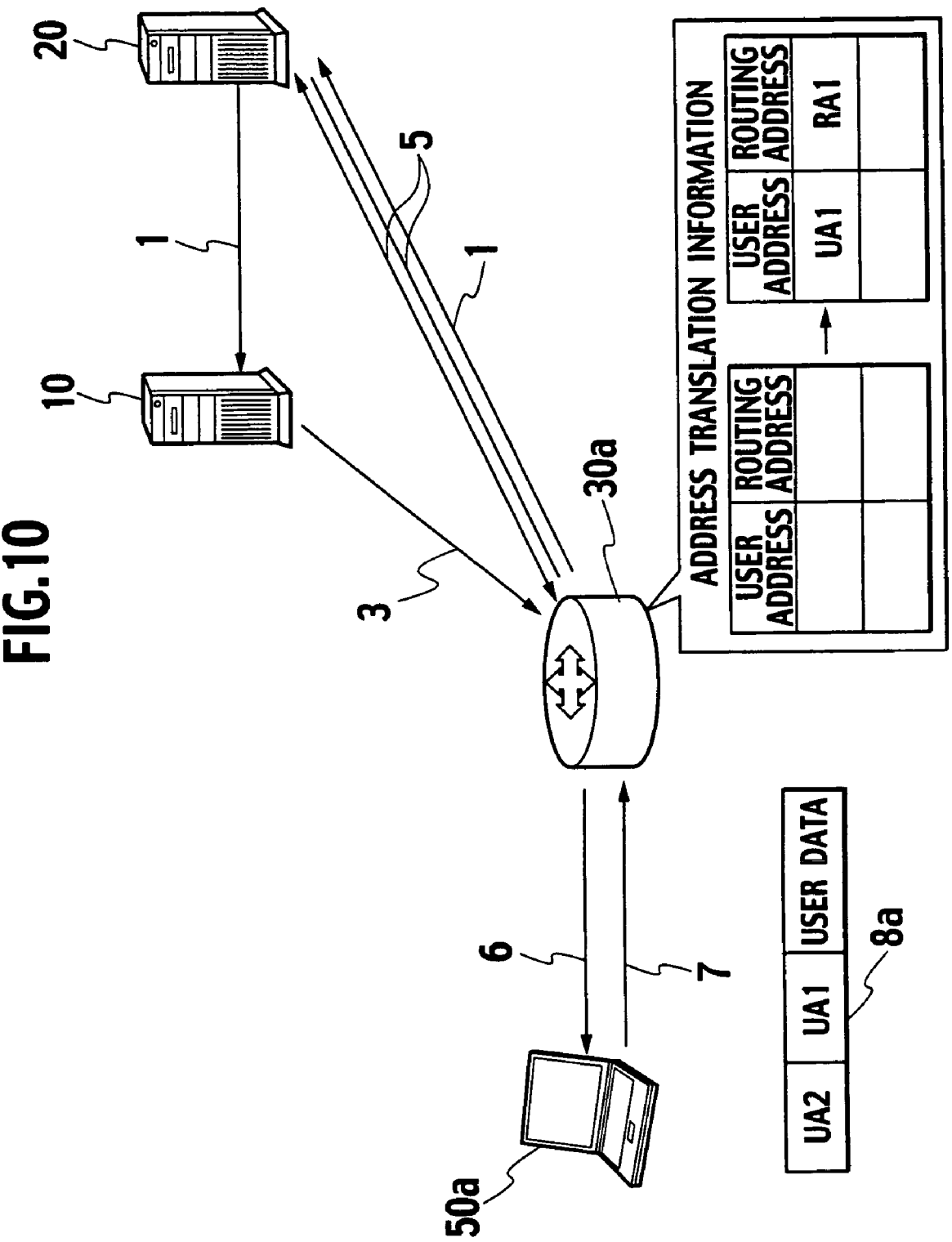
FIG. 10 is a diagram showing a process from the roaming-in to the new registration of address translation information according to an embodiment of the present invention.

The MIP terminal 50*a* sets an identifier duplication confirmation completion waiting time X in advance. When the MIP terminal 50*a* does not receive a neighbor advertisement message for notifying that the unique identifier and the existing identifier are duplicated from the access router 30*a* even when the identifier duplication confirmation completion waiting time X has elapsed after transmitting the neighbor solicitation message 7, the MIP terminal 50 judges that the connection to the mobile communication system 100 has been permitted. Then, the MIP terminal 50*a* generates the care-of address "UA1" from the interface identifier, which its own has, and the global prefix unique to the access router 30*a* included in the advertisement information. Then, the MIP terminal 50*a* sets the care-of address "UA1" to the source address and transmits a user data packet 8*a* in which a user address "UA2" of the corresponding terminal 50*b* is set to the source address to the access router 30*a*. Hereinafter, the address set to the user data packet is described in order of the destination address and the source address as shown in FIG. 10. The neighbor solicitation message 7 and the neighbor advertisement message 9 are transmitted and received as a user control packet.

The I/F 31 of the access router 30*a* receives the user data packet 8*a* from the MIP terminal 50*a* and inputs it into the assignment unit 35. After acquiring the care-of address "UA1" from the source address of the user data packet 8*a*, the assignment unit 35 stores the user data packet 8*a* in the buffer 37. In this manner, the access router 30*a* buffers the user data packet temporarily.

The assignment unit 35 refers to the judgment result storage unit 38 and confirms whether a duplicate identifier confirmation state of the acquired care-of address "UA1" has been set. When confirming that the duplicate identifier confirmation state has been set and the unique identifier of the MIP terminal 50*a* and the existing unique identifier are different, the assignment unit 35 assigns a routing address "RA1" to the care-of address "UA1" of the MIP terminal 50*a*. In this manner, it is possible for the access router 30*a* to quickly assign the routing address upon receipt of the user data packet by setting and storing the duplicate identifier confirmation state.

The assignment unit 35 generates the entry notification message 1 in which the care-of address "UA1" is set to the field of the user address, the assigned routing address "RA1" is set to the field of the routing address, the address "ARA1" of the access router 30*a* is set to the field of the access router address, and "Off" is set to the fields of the response request flag and the response flag, and inputs it into the I/F 31. The I/F 31 transmits the entry notification message 1 to the roaming terminal management device 20.

The I/F 21 of the roaming terminal management device 20 receives the entry notification message 1 and inputs it into the terminal management unit 24. The terminal management unit 24 extracts an interface identifier from the care-of address "UA1" of the entry notification message 1. When the terminal management table 22 stores a link local address as a unique identifier, the terminal management unit 24 generates a link local address using the interface identifier. The terminal management unit 24 generates an entry to be registered in the terminal management table 22 (hereinafter referred to as a "terminal management table entry"), which has the care-of address "UA1", namely, the user address, associated with the unique identifier "a" (the extracted interface identifier or the generated link local address) and the access router address "ARA1", based on the entry notification message 1, and newly registers it in the terminal management table 22. After the registration, the terminal management unit 24 transfers the entry notification message 1 to the address management device 10 via the I/F 21.

The I/F 11 of the address management device 10 receives the entry notification message 1 and inputs it into the address management unit 14. The address management unit 14 generates an entry to be registered in the address management table 12 (hereinafter, referred to as an "address management table entry"), which has the care-of address "UA1", namely, the user address, associated with the routing address "RA1" and the access router address "ARA1", based on the entry notification message 1, and newly registers it in the address management table 12.

After the registration, the address management unit 14 generates the register/delete request message 3 in which the care-of address "UA1" is set to the field of the user address, the assigned routing address "RA1" is set to the field of the routing address, "Register" is set to the field of the message type, and "Off" is set to the field of the response flag, and inputs it into the I/F 11. The I/F 11 transmits the register/delete request message 3 to the access router 30a.

The I/F 31 of the access router 30a receives the register/delete request message 3 and inputs it into the translation information management unit 34. The translation information management unit 34 generates an entry to be registered in the translation information table 32 (hereinafter, referred to as a "translation information table entry"), which has the care-of address "UA1", namely, the user address, associated with the routing address "RA1" and the valid term, based on the register/delete request message 3, and newly registers it in the translation information table 32. Due to this, as shown in FIG. 10, the access router 30a results in storing new address translation information "user address UA1: routing address RA1". Hereinafter, the address translation information, that is, the correspondence between the user address UA and the routing address RA is expressed by "UA:RA".

Figure 11:
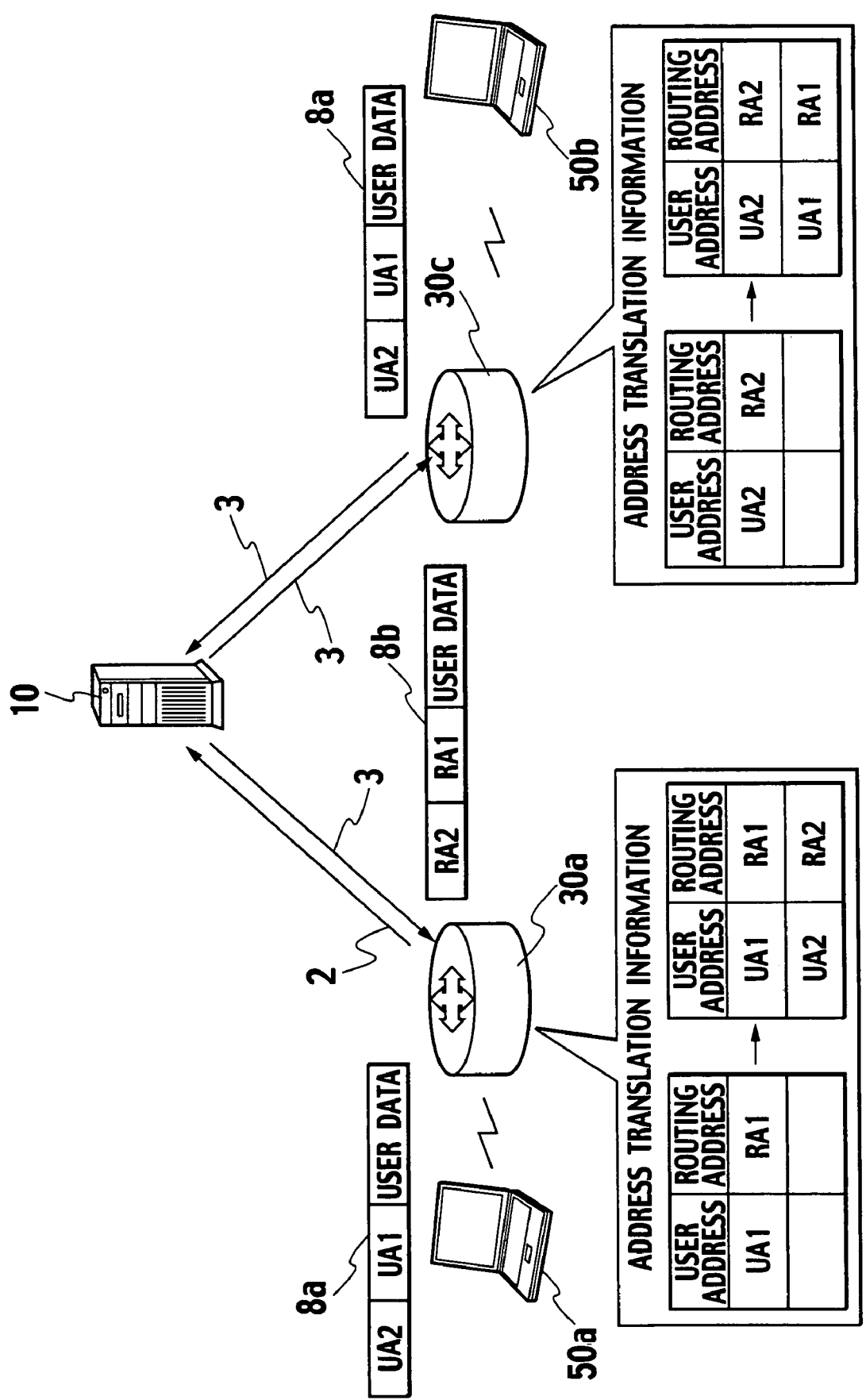
FIG. 11 is a diagram showing a process for transferring a user data packet according to an embodiment of the present invention.

Next, the process when the access router 30a transfers the user data packet received from the MIP terminal 50a is explained using FIG. 11. The access router 30a buffers the user data packet 8a received from the MIP terminal 50a in the buffer 37 in FIG. 10. First, the transfer unit 36 retrieves the translation information table 32 based on the user address "UA2" of the corresponding terminal 50b set to the destination address of the buffered user data packet 8a. When the address translation information including the user address "UA2" does not exist, the transfer unit 36 generates an address resolution request message. Specifically, the transfer unit 36 generates the address resolution request message 2, as shown in FIG. 9B, in which the care-of address "UA1" set to the source address of the user data packet 8a is set to the field of the source user address and the care-of address "UA2" set to the destination address of the user data packet 8a is set to the field of the destination user address, and inputs it into the I/F 31. The I/F 31 transmits the address resolution request message 2 to the address management device 10.

The I/F 11 of the address management device 10 receives the address resolution request message 2 and inputs it into the address management unit 14. The address management unit 14 acquires the source user address "UA1" from the address resolution request message 2. The address management unit 14 retrieves the address management table 12 based on the acquired user address "UA1", and generates the register/delete request message 3 in which the care-of address "UA1" is set to the field of the user address, the routing address "RA1" is set to the field of the routing address, "Register" is set to the field of the message type, and "On" is set to the field of the response flag.

Further, the address management unit 14 retrieves the address management table 12 based on the destination address "UA2" of the address resolution request message 2, and acquires the access router address "ARA2" of the access router 30c to which the corresponding terminal 50b of the correspondent connects. Then, the address management unit 14 inputs the generated register/delete request message 3 into the I/F 11 and instructs to transmit it to the access router 30c. In this manner, the address management unit 14 instructs to register the address translation information of the MIP terminal 50a, which is the source of the user data packet 8a, into the access router 30c to which the corresponding terminal 50b being the destination of the user data packet 8a connects. The I/F 11 transmits the register/delete request message 3 to the access router 30c.

Furthermore, the address management unit 14 detects that the correspondent of the MIP terminal 50a is the corresponding terminal 50b and the correspondent of the corresponding terminal 50b is the MIP terminal 50a, from the destination user address "UA2" and the source address "UA1" of the address resolution request message 2. The address management unit 14 registers the user address of the correspondent in the field of the option information of the address management table 12. In this case, the address management unit 14 registers "correspondent: UA2" in the filed of the option information of the user address "UA1" and "correspondent: UA1" in the field of the option information of the user address "UA2".

The I/F 31 of the access router 30c receives the register/delete request message 3 and inputs it into the translation information management unit 34. The translation information management unit 34 generates a translation information table entry in which the user address "UA1" is associated with the routing address "RA1" and the valid term, based on the register/delete request message 3, and newly registers it in the translation information table 32. Due to this, the new address translation information "user address UA1: routing address RA1" is added to the access router 30c as shown in FIG. 11. The translation information management unit 34 sets "On" to the field of the response flag of the received register/delete request message 3 and returns it to the address management device 10 via the I/F 31.

When acquiring the register/delete request message 3 (response) from the access router 30c via the I/F 11, the address management unit 14 inputs the address resolution request message 2 into the address resolution unit 13. The address resolution unit 13 retrieves the address management table 12 based on the destination user address "UA2" of the address resolution request message 2, generates the register/delete request message 3 in which the user address "UA2" is set to the field of the user address, the routing address "RA2" is set to the field of the routing address, "Register" is set to the field of the message type, and "Off" is set to the field of the response flag, and inputs it into the I/F 11. The I/F 11 transmits the register/delete request message 3 to the access router 30a The I/F 31 of the access router 30a receives the register/delete request message 3 and inputs it into the translation information management unit 34. The translation information management unit 34 generates a translation information table entry in which the user address "UA2" is associated with the routing address "RA2" and the valid term, based on the register/delete request message 3, and newly registers it in the translation information table 32. Due to this, the new address translation information "user address UA2: routing address RA2" is added to the access router 30a, as shown in FIG. 11.

Then, the transfer unit 36 acquires the user data packet 8a from the buffer 37 and releases the buffering. The transfer unit 36 retrieves the translation information table 32 based on the user address "UA2" set to the destination address and the user address "UA1" set to the source address of the user data packet 8a, and acquires the routing addresses "RA2" and "RA1". The transfer unit 36 generates a user data packet 8b by translating the user address "UA2" of the destination address into the acquired routing address "RA2" and the user address "UA1" of the source address into the acquired routing address "RA1", and transfers it to the access router 30c via the I/F 31. Alternatively, the transfer unit 36 may encapsulate the user data packet 8a using the routing address "RA2" and transfer it. As the "RA2" in this case, the access router address of the access router 30c is used.

The transfer unit 36 of the access router 30c retrieves the translation information table 32 based on the routing address "RA2" set to the destination address and the routing address "RA1" set to the source address of the received user data packet 8b, and acquires the user addresses "UA2" and "UA1". The transfer unit 36 restores the user data packet 8b to the user data packet 8a by translating the routing address "RA2" of the destination address into the acquired user address "UA2" and the routing address "RA1" of the source address into the acquired user address "UA1", respectively, and transfers it to the corresponding terminal 50b. When the user data packet 8a has been encapsulated using the routing address "RA2", the transfer unit 36 decapsulates and takes out the user data packet 8a, and transfers it to the corresponding terminal 50b.

Figure 12:
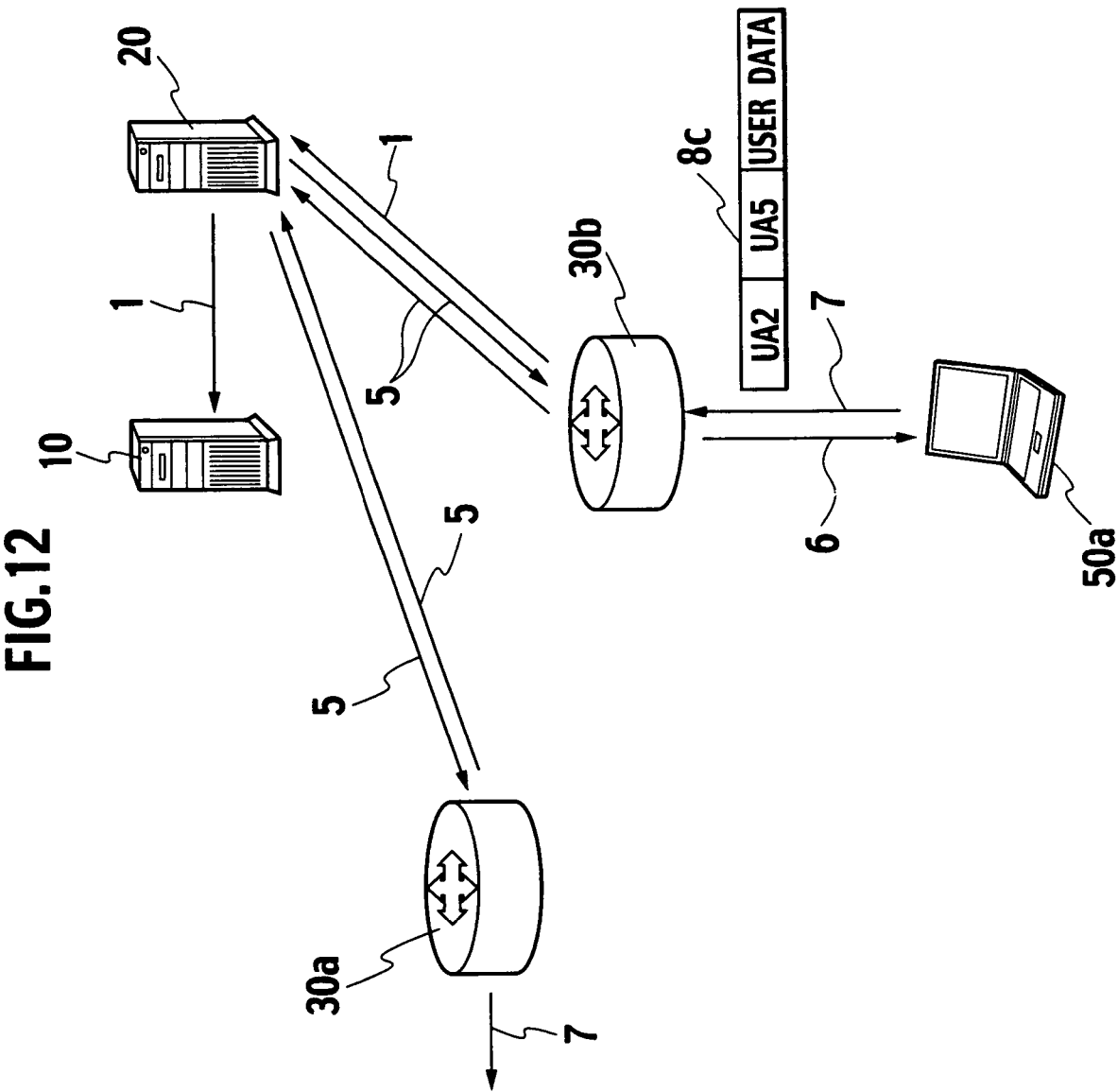
FIG. 12 is a diagram showing a process for detecting a handover according to an embodiment of the present invention.
Figure 13:
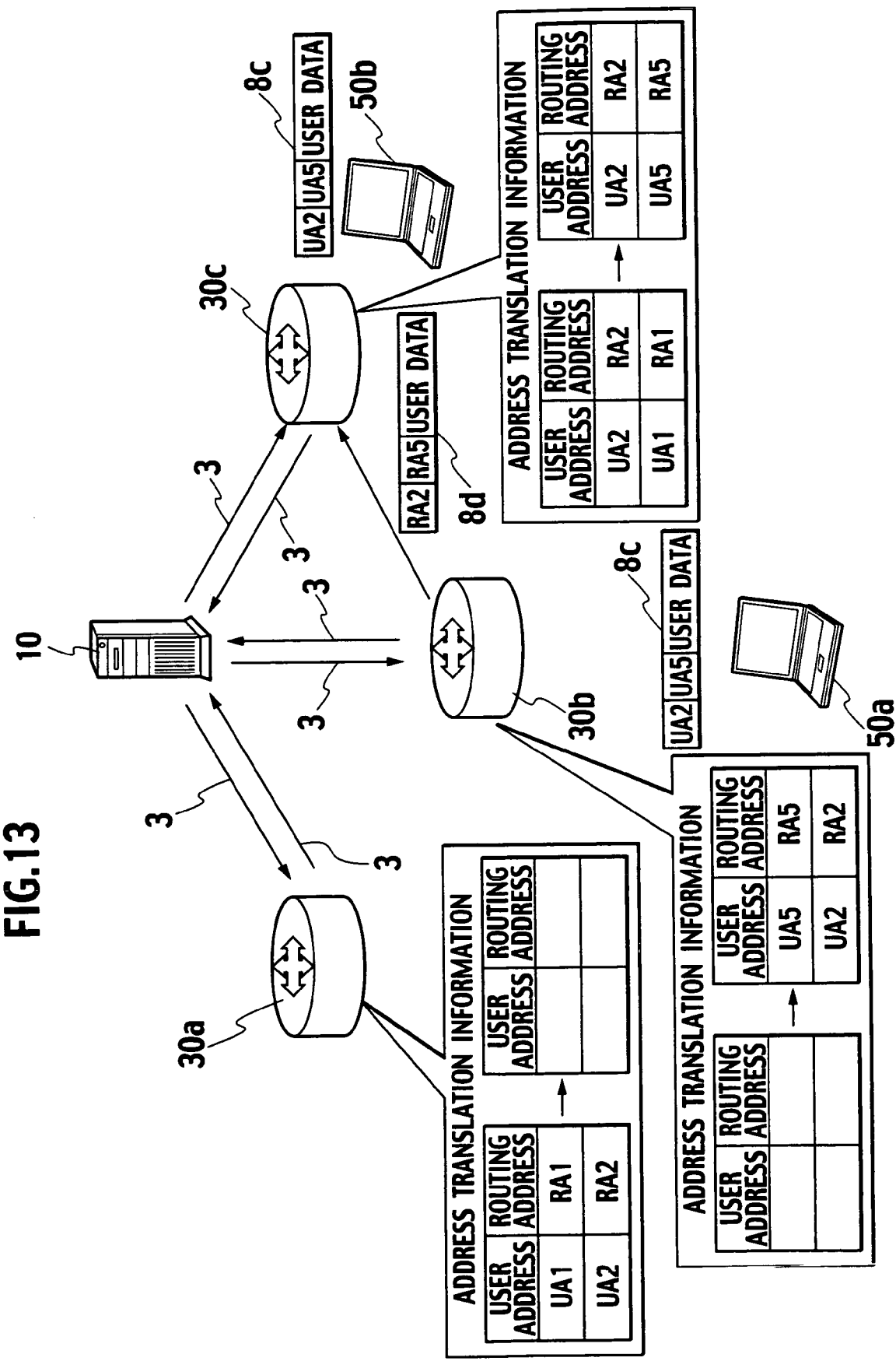
FIG. 13 is a diagram showing the registration, update, and deletion of address translation information and the transfer of a user data packet when a handover is carried out according to an embodiment of the present invention.

Next, the process in a case where the MIP terminal 50a in communication with the corresponding terminal 50b moves and connects to the access router 30b and a handover is made from the access router 30a to the access router 30b is explained using FIG. 12 and FIG. 13. First, the process from the detection of a handover to the update of the address translation information and the like in the address management device 10 is explained using FIG. 12. When the MIP terminal 50a moves and connects to the access router 30b, as in the case shown in FIG. 10, the access router 30b provides the MIP terminal 50a with the advertisement information 6, and the MIP terminal 50a transmits the neighbor solicitation request 7 to the access router 30b by multicast-transmitting it in the same link.

The translation information management unit 34 of the access router 30b acquires an interface identifier from the neighbor solicitation request 7 and generates a care-of address "UA5" expected to be generated by the MIP terminal 50a when the unique identifier and the existing unique identifier of the MIP terminal 50a are not duplicated, using the interface identifier and the global prefix unique to the access router 30b included in the advertisement information. The translation information management unit 34 retrieves the translation information table 32 based on the generated care-of address "UA5" and confirms whether or not the care-of address "UA5" exists.

When the same care-of address does not exist in the translation information table 32, the translation information management unit 34 generates the duplication confirmation message 5 in which the care-of address "UA5" expected to be used by the MIP terminal 50a is set to the field of the care-of address and "Off" is set to the field of the response type flag, and inputs it into the I/F 31. The I/F 31 transmits the duplication confirmation message 5 generated by the translation information management unit 34 to the roaming terminal management device 20.

The I/F 21 of the roaming terminal management device 20 receives the duplication confirmation message 5 from the access router 30b and inputs it into the judgment unit 23. The judgment unit 23 extracts an interface identifier from the care-of address "UA5" set to the duplication confirmation message 5. When the terminal management table 22 stores a link local address as a unique identifier, the judgment unit 23 generates a link local address using the interface identifier. The judgment unit 23 retrieves the terminal management table 22 based on the unique identifier such as the interface identifier or the link local address, and judges whether or not the same unique identifier exists in the terminal management table 22.

At this time, since the routing address has been assigned to the MIP terminal 50a by the access router 30a before a handover and the existing routing address exists, the terminal management table 22 stores the terminal information. Therefore, the judgment unit 23 detects that the unique identifier "a", which is the same as the unique identifier of the MIP terminal 50a, exists in the terminal management table 22. The judgment unit 23 acquires the user address "UA1" associated with the detected same identifier "a" and the access router address "ARA1" from the terminal management table 22.

The judgment unit 23 generates the duplication confirmation message 5 in which the care-of address "UA1" associated with the detected same unique identifier "a" is set to the field of the care-of address and "Off" is set to the field of the response type flag. The judgment unit 23 inputs the generated duplication confirmation message 5 into the I/F 21, and instructs to transmit it to the access router 30a having the access router address "ARA1". The I/F 21 transmits the duplication confirmation message 5 to the access router 30a The I/F 31 of the access router 30a receives the duplication confirmation message 5 from the roaming terminal management device 20 and inputs it into the translation information management unit 34. The translation information management unit 34 acquires a unique identifier from the care-of address "UA1" included in the duplication confirmation message 5, generates the neighbor solicitation message 7, and inputs it into the I/F 31. The translation information management unit 34 instructs the I/F 31 to transmit the neighbor solicitation message 7 to the communication terminal existing in subordination to the access router 30a, that is, currently connecting to the access router 30a The I/F 31 transmits the neighbor solicitation message 7 to the communication terminal in subordination to the access router 30a via an access point existing in subordination to the access router 30a.

Alternatively, the translation information management unit 34 generates the address "UA1" using the interface identifier acquired from the care-of address "UA1" included in the duplication confirmation message 5, and the global prefix of the access router 30a, and instructs the I/F 31 to transmit the neighbor solicitation message 7 to the generated address "UA1". The I/F transmits the neighbor solicitation message 7 to the address "UA1" via the access point existing in subordination to the access router 30a.

The translation information management unit 34 of the access router 30a sets a subordinate terminal duplication confirmation completion waiting time Z in advance. If the translation information management unit 34 does not receive the neighbor advertisement message for the neighbor solicitation message 7 even when the subordinate terminal duplicate confirmation completion waiting time Z has elapsed, the translation information management unit 34 judges that the unique identifier of the MIP terminal 50a does not duplicate the existing unique identifier, and has not been used by other communication terminals. In this manner, the translation information management unit 34 confirms whether the unique identifier has not been duplicated in subordinates to the access router 30a and can be identified uniquely. Further, if the translation information management unit 34 does not receive the neighbor advertisement message even though the translation information table 32 stores the address translation information, it judges that the MIP terminal 50a has moved and carried out a handover. The translation information management unit 34 sets "No-duplication flag" to the response type flag of the received duplication confirmation message 5 and returns it to the roaming terminal management device 20 via the I/F 31.

The I/F 21 of the roaming terminal management device 20 receives the duplication confirmation message 5 from the access router 30a and inputs it into the judgment unit 23. The judgment unit 23 judges that the reason why the same unique identifier as that of the MIP terminal 50a exists in the terminal management table 22 is that the existing routing address assigned by the access router 30a other than the access router 30b (that is, other access router) to which the MIP terminal 50a currently connects exits and is not that the unique identifier of the MIP terminal 50a and the existing unique identifier are duplicated, based on the duplication confirmation message 5 in which "No-duplication flag" has been set. Further, it is possible for the judgment unit 23 to detect that the MIP terminal 50a has carried out a handover from the access router 30a to the access router 30b from the fact that the routing address has been assigned to the MIP terminal 50a by the access router 30a (other access router) and the existing routing address exists.

As described above, it is possible for the judgment unit 23 to make a handover judgment and an identifier duplication judgment using the terminal management table 22 and the duplication confirmation message 5 based on the unique identifier of the MIP terminal 50a even if the care-of address used as a user address has changed through the handover. In other words, the roaming terminal management device 20 is capable of making an identifier duplication judgment expanded to other access routers by cooperating with the access router 30a. The judgment unit 23 inputs the results of the identifier duplication judgment and the handover judgment into the terminal management unit 24.

The terminal management unit 24 generates the duplication confirmation message 5 in which the care-of address "UA5" being a target of judgment is set to the field of the care-of address and "No-duplication flag" is set to the field of the response type flag, and transmits the duplication confirmation message 5 to the access router 30b via the I/F 21. In this manner, the terminal management unit 24 notifies the access router 30b of the result of the identifier duplication judgment made by the judgment unit 23. Due to this, the roaming terminal management device 20 permits the connection of the MIP terminal 50a to the access router 30b.

The I/F 31 of the access router 30b receives the duplication confirmation message 5 from the roaming terminal management device 20 and inputs it into the translation information management unit 34. The translation information management unit 34 generates a duplicate identifier confirmation state based on the duplication confirmation message 5 in which "No-duplication flag" is set, and sets it to the judgment result storage unit 38 correspondingly with the care-of address "UA5" generated using the interface identifier confirmed to have not been duplicated.

If the MIP terminal 50a does not receive the neighbor advertisement message from the access router 30b even when the duplication confirmation completion waiting time X set in advance has elapsed, the MIP terminal 50a generates the care-of address "UA5" from the interface identifier, which its own has, and the global prefix unique to the access router 30b included in the advertisement information. Then, the MIP terminal 50a transmits to the access router 30b a user data packet 8c in which the care-of address "UA5" is set to the source address and the user address "UA2" of the corresponding terminal 50b is set to the destination address.

The IF/31 of the access router 30b receives the user data packet 8c from the MIP terminal 50a and inputs it into the assignment unit 35. After acquiring the care-of address "UA5" from the source address of the user data packet 8c, the assignment unit 35 stores the user data packet 8c in the buffer 37. The assignment unit 35 refers to the judgment result storage unit 38 and confirms whether the duplicate identifier confirmation state of the acquired care-of address "UA5" has been set Then, the assignment unit 35 assigns a new routing address "RA5" to the care-of address "UA5" of the MIP terminal 50a.

The assignment unit 35 generates the entry notification message 1 in which the care-of address "UA5" is set to the field of the user address, the assigned routing address "RA5" to the field of the routing address, the address "ARA5" of the access router 30b to the field of the access router address, and "Off" to the fields of the response request flag and the response flag, and inputs it into the I/F 31. The I/F 31 transmits the entry notification message 1 to the roaming terminal management device 20.

The I/F 21 of the roaming terminal management device 20 receives the entry notification message 1 and inputs it into the terminal management unit 24. The terminal management unit 24 generates a terminal management table entry in which the care-of address "UA5" being the user address, is associated with the unique identifier "a" (the extracted interface identifier or the generated link local address) and the access router address "ARA5", based on the entry notification message 1. The terminal management unit 24 updates the terminal management table entry including the unique identifier "a" stored in the terminal management table 22 to a newly generated terminal management table entry.

After the registration, the terminal management unit 24 sets the handover option 1a indicating that the MIP terminal 50a has carried out a handover to the entry notification message 1 from the access router 30b, based on the result of the handover judgment acquired from the judgment unit 23. Specifically, the terminal management unit 24 sets "On" to the field of the handover option flag, and the user address "UA1" before update to the filed of the previous user address. The terminal management unit 24 transfers the entry notification message 1 to the address management device 10 via the I/F 21.

The I/F 11 of the address management device 10 receives the entry notification message 1 from the roaming terminal management device 20 and inputs it into the address management unit 14. The address management unit 14 acquires the result of the handover judgment that the existing routing address already assigned to the MIP terminal 50a by other access router exists and a handover has been carried out by detecting the handover option 1a of the entry notification message 1. The address management unit 14 retrieves the address management table 12 based on the previous user address "UA1" included in the entry notification message 1. The address management unit 14 acquires the address management table entry including the previous user address "UA1", the existing routing address "RA1", the access router address "ARA1", and "correspondent: UA2" from the address management table 12, and stores it in the buffer 15. In this manner, the buffer 15 temporarily stores the address management table entry before the handover.

Further, the address management unit 14 generates a new address management table entry in which the care-of address "UA5" being the user address, has been associated with the routing address "RA5" and the access router address "ARA5", based on the entry notification message 1. The address management unit 14 deletes the address management table entry including the previous user address "UA1", registers the address management table entry including the newly generated user address "UA5", and updates the address management table 12.

After the update of the address translation information and the like in the address management device 10 is completed, the registration, update, and deletion of the address translation information of the access routers 30a to 30c and the transfer of the user data packet are carried out as shown in FIG. 13. First, the address management 14 generates the register/delete request message 3 in which the care-of address "UA5" is set to the field of the user address, the assigned routing address "RA5" is set to the field of the routing address, "Register" is set to the field of the message type, and "Off" the field of the response flag, and further, the previous user address "UA1" is set to the field of the additional user address of the multiple notification option 3a, the existing routing address "RA1" assigned to the "UA1" is set to the field of the additional routing address, and "Delete" is set to the field of the additional message type.

Further, the address management unit 14 refers to the option information in the address management table 12 based on the previous user address "UA1" set to the handover option 1a, and detects the corresponding terminal 50b having the user address "UA2", the correspondent of which is the previous address "UA1". The address management unit 14 retrieves the address management table 12 based on the detected user address "UA2" and acquires the access router address "ARA2" of the access router 30c to which the corresponding terminal 50b being the correspondent connects. Furthermore, the address management unit 14 updates the field of the option information of the user address "UA2" to that of "correspondent: UA5".

Then, the address management unit 14 inputs the generated register/delete request 3 into the I/F 11 and instructs to transmit it to the access router 30c. In this manner, the address management unit 14 instructs the access router 30c to which the corresponding terminal 50b being the correspondent of the MIP terminal 50a connects to update the address translation information of the MIP terminal 50a changed through the handover. The I/F 11 transmits the register/delete request message 3 to the access router 30c.

The I/F 31 of the access router 30c receives the register/delete request message 3 and inputs it into the translation information management unit 34. The translation information management unit 34 deletes the translation information table entry including the previous user address "UA1" and the existing routing address "RA1" from the translation information table 32 based on the register/delete request message 3. Further, the translation information management unit 34 generates a new translation information table entry in which the user address "UA5" is associated with the routing address "RA5" and the valid term based on the register/delete request message 3, and registers it in the translation information table 32. In this manner, the access router 30c updates the address translation information of the MIP terminal 50a changed through the handover. Due to this, the address translation information of the access router 30c is updated from "user address UA1: routing address RA1" to "user address UA5: routing address RA5", as shown in FIG. 13. The translation information management unit 34 sets "On" to the field of the response flag of the received register/delete request message 3 and returns it to the address management device 10 via the I/F 31.

After acquiring the register/delete request message 3 (response) from the access router 30c via the I/F 11, the address management unit 14 generates the register/delete request message 3 in which the care-of address "UA5" is set to the field of the user address, the routing address "RA5" is set to the field of the routing address, "Register" is set to the field of the message type, and "Off" is set to the field of the response flag, and further, the user address "UA2" of the corresponding terminal 50b is set to the field of the additional user address of the multiple notification option 3a, "RA2" is set to the field of the additional routing address, and "Register" is set to the field of the additional message type.

Then, the address management unit 14 inputs the generated register/delete request message 3 into the I/F 11 and instructs to transmit it to the access router 30b. In this manner, the address management unit 14 instructs the access router 30b being the handover destination to register the address translation information of the MIP terminal 50a and the address translation information of the corresponding terminal 50b together. The I/F 11 transmits the register/delete request message 3 to the access router 30b.

The I/F 31 of the access router 30b receives the register/delete request message 3 and inputs it into the translation information management unit 34. The translation information management unit 34 generates a translation information table entry in which the user address "UA5" is associated with the routing address "RA5" and the valid term, and a translation information table entry in which the user address "UA2" is associated with the routing address "RA2" and the valid term, based on the register/delete request message 3, and newly registers them in the translation information table 32. Due to this, as shown in FIG. 13, two pieces of the new address translation information "user address UA5: routing address RA5" and "user address UA2: routing address RA2" are registered into the access router 30b at the same time. The translation information management unit 34 sets "On" to the field of the response flag of the received register/delete request message 3 and returns it to the address management device 10 via the I/F 31.

Then, the transfer unit 36 acquires the user data packet 8c from the buffer 37 in the same manner as that shown in FIG. 11 and transfers to the access router 30c a user data packet 8d in which the user address "UA2" of the destination address has been translated into the routing address "RA2" and the source user address "UA5" has been translated into the routing address "RA5" by referring to the translation information table 32. Alternatively, the transfer unit 36 may encapsulate the user data packet 8c using the routing address "RA2" and transfer it As "RA2" in this case, the access router address of the access router 30c is used.

Then, the transfer unit 36 of the access router 30c refers to the translation information table 32 and restores the user data packet 8d to the user data packet 8c by translating the routing address "RA2" of the destination address into the user address "UA2" and the routing address "RA5" of the source address into the user address "UA5", and to transfer it to the corresponding terminal 50b. Alternatively, the transfer unit 36 decapsulates and takes out the user data packet 8c, and transfers it to the corresponding terminal 50b.

As described above, the address management device 10 instructs to register and update the address translation information stored in the access router 30b to which the MIP terminal 50a connects and the access router 30c to which the corresponding terminal 50b connects, and the access routers 30a and 30c carry out the registration and update according to the instruction. Therefore, the user data packet is transferred from the MIP terminal 50a to the corresponding terminal 50b without any change before and after a handover even if the MIP terminal 50a carries out the handover. In other words, the address management device 10 and the access routers 30a and 30b cooperate with each other, thereby, allowing the mobile communication system 100 to provide the MIP terminal 50a with communication mobility. Then, it is possible for the MIP terminal 50a and the corresponding terminal 50b to continue communication without the need to take movement in mind, which allows mobility to be secured.

Further, the address management unit 14 acquires the register/delete request message 3 that is a response to the register/delete request message 3 transmitted from the access router 30b via the I/F 11. The address management unit 14 acquires from the buffer 15 the address management table entry before the handover carried out by the MIP terminal 50a, which includes the previous user address "UA1", the routing address "RA1", the access router address "ARA1", and the "correspondent: UA2".

The address management unit 14 judges whether or not the communication terminal exists in subordination to the access router 30a, which is in communication with the corresponding terminal 50b, based on the access router address "ARA1" and the correspondent "UA2" of the acquired address management table entry. When the communication terminal exists in subordination to the access router 30a, which is in communication with the corresponding terminal 50b, the address management unit 14 sets the care-of address "UA1" to the field of the user address, the routing address "RA1" to the field of the routing address, "Delete" to the field of the message type, and "Off" to the field of the response flag, based on the acquired address management table entry before the handover, and thus generates the register/delete request message 3.

When there exists no communication terminal in subordination to the access router 30a, which is in communication with the corresponding terminal 50b, the address management unit 14 generates the register/delete request message 3 in which the care-of address "UA1" is set to the field of the user address, the routing address "RA1" is set to the field of the routing address, "Delete" is set to the field of the message type, and "Off" is set to the field of the response flag, and further, the user address "UA2" of the corresponding terminal 50b is set to the field of the additional user address of the multiple notification option 3a, "RA2" is set to the field of the additional routing address, and "Delete" is set to the field of the additional message type, based on the acquired address management table entry generated before the handover.

Then, the address management unit 14 inputs the generated register/delete request message 3 into the I/F 11 and instructs to transmit it to the access router 30a based on the access router address "ARA1" included in the address management table entry before the handover. In this manner, the address management unit 14 instructs the access router 30a, which is a handover source access router, to delete the address translation information of the MIP terminal 50a. In other words, when the judgment unit 23 has detected that the handover is carried out, the address management unit 14 functions as a delete instruction unit configured to instruct the other access routers to delete the correspondence (hereinafter, referred to as an "existing correspondence") between the transient address hereinafter, referred to as a "previous transient address") used by the MIP terminal 50a while in connection to the other access router, and the existing routing address. The I/F 11 transmits the register/delete request message 3 to the access router 30a.

The I/F 31 of the access router 30a receives the register/delete request message 3 and inputs it into the translation information management unit 34. The translation information management unit 34 deletes only the translation information table entry including the user address "UA1" and the routing address "RA1" or both the translation information table entry including the user address "UA1" and the routing address "RA1" and the translation information table entry including the user address "UA2" and the routing address "RA2" from the translation information table 32 based on the register/delete request message 3.

Due to this, "user address UA1: routing address RA1" that is no longer necessary because the MIP terminal 50a ceased to be in subordination to the access router 30a is deleted from the address translation information stored in the access router 30a, as shown in FIG. 13. Further, when there exists no communication terminal in subordination to the access router 30a, which is in communication with the corresponding terminal 50b, "user address UA2: routing address RA2" is also deleted as shown in FIG. 13. The translation information management unit 34 sets "On" to the field of the response flag of the received register/delete request message 3 and returns it to the address management device 10 via the I/F 31.

As shown in FIG. 12 and FIG. 13, the judgment unit 23 of the roaming terminal management device 20 judges whether or not the existing routing address of the MIP terminal 50a exists, and makes a handover judgment for judging whether or not a handover is carried out, and the address management unit 14 of the address management device 10 instructs the access router 30a (other access router) other than the access router 30b to which the MIP terminal 50a currently connects to delete the address translation information (the existing correspondence) of the MIP terminal 50a in accordance with the result of the handover judgment made by the judgment unit 23. In this manner, the roaming terminal management device 20 and the access router 30a can full the function as the management device 40 by cooperating with each other. Further, the roaming terminal management device 20 and the access router 30a cooperate with each other, thereby making it possible to uniquely identify the MIP terminal 50a based on the unique identifier even when the care-of address changes, and to manage the routing address assigned to the care-of address that changes dynamically.

Figure 14:
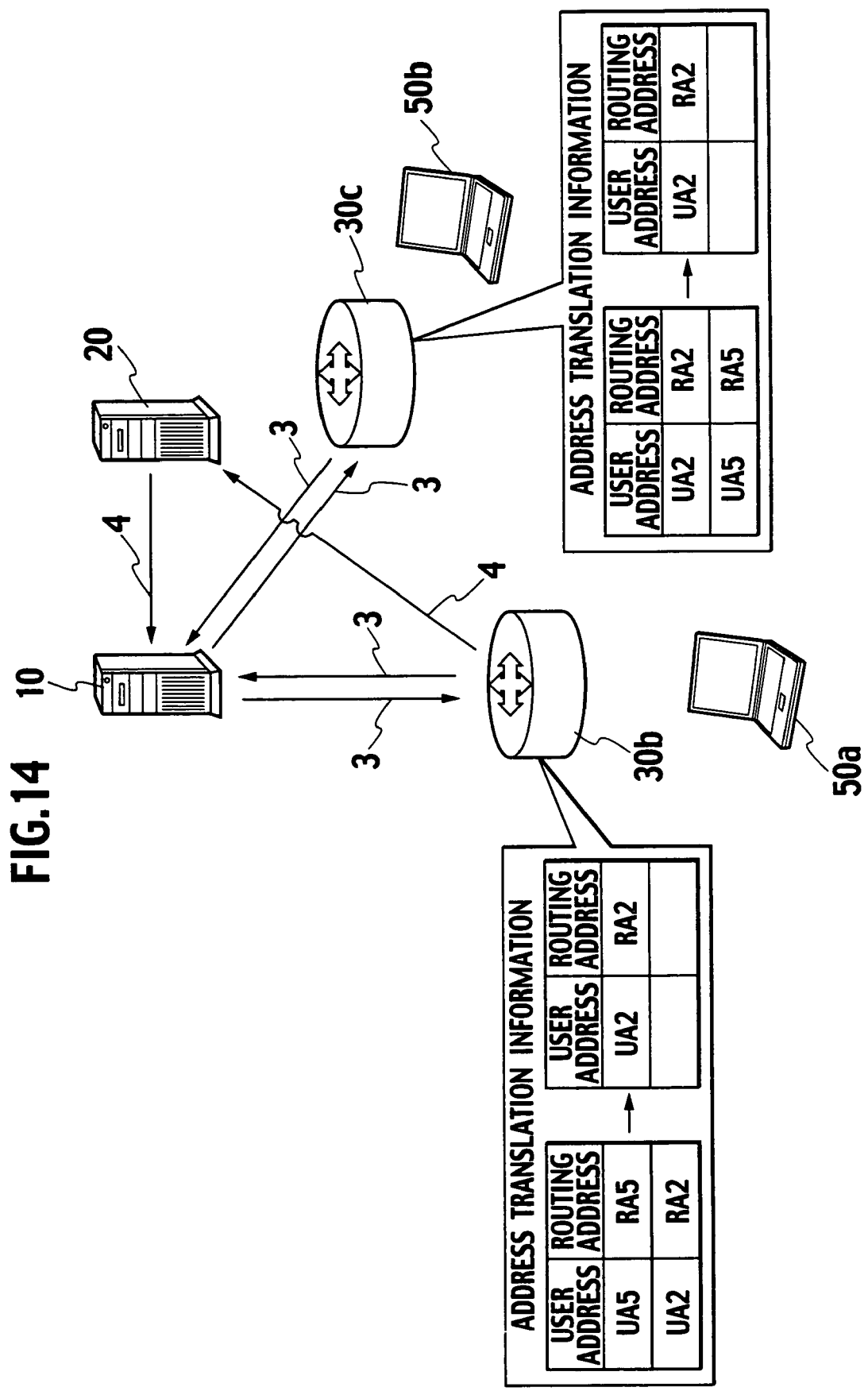
FIG. 14 is a diagram showing a process when the valid term of address translation information has expired according to an embodiment of the present invention.

Next, the process when the valid term of the address translation information stored in the access routers 30a to 30c has expired is explained using FIG. 14, taking the access router 30b as an example. The translation information management unit 34 of the access router 30b refers to the valid term of the translation information table 32 periodically and monitors the valid term. When detecting the expiration of the valid term of the user address "UA5", the translation information management unit 34 sets the user address "UA5" the valid term of which has expired to the field of the user address, generates a term expiration notification message 4, and inputs it into the I/F 31. The I/F 31 transmits the term expiration notification message 4 to the roaming terminal management device 20.

The I/F 21 of the roaming terminal management device 20 receives the term expiration notification message 4 from the access router 30b and inputs it into the terminal management unit 24. The terminal management unit 24 extracts an interface identifier from the care-of address "UA5" set to the term expiration notification message 4. When the terminal management table 22 stores a link local address as a unique identifier, the terminal management unit 24 generates a link local address using the interface identifier. The terminal management unit 24 retrieves the terminal management table 22 based on the unique identifier such as the interface identifier or the link local address, and detects the same unique identifier. The terminal management unit 24 deletes the terminal management table entry including the detected unique identifier from the terminal management table 22. After the deletion, the terminal management unit 24 transfers the term expiration notification message 4 to the address management device 10 via the I/F 11.

The I/F 11 of the address management device 10 receives the term expiration notification message 4 from the roaming terminal management device 20 and inputs it into the address management unit 14. The address management unit 14 refers to the option information of the address management table 12 based on the "UA5" set to the user address of the term expiration notification message 4 and detects the corresponding terminal 50b having the user address "UA2", the correspondent of which is the user address "UA5". The address management unit 14 retrieves the address management table 12 based on the detected user address "UA2" and acquires the access router address "ARA2" of the access router 30c to which the corresponding terminal 50b connects.

The address management unit 14 generates the register/delete request message 3 in which the care-of address "UA5" is set to the field of the user address, the routing address "RA5" is set to the field of the routing address, "Delete" is set to the field of the message type, and "Off" is set to the field of the response flag. Then, the address management unit 14 inputs the generated register/delete request message 3 into the I/F 11 and instructs to transmit it to the access router 30c. In this manner, the address management unit 14 instructs the access router 30c to which the corresponding terminal 50b connects being the correspondent of the MIP terminal 50a, to delete the address translation information of the MIP terminal 50a the valid term of which has expired in the access router 30b. The I/F 11 transmits the register/delete request message 3 to the access router 30c.

The I/F 31 of the access router 30c receives the register/delete request message 3 and inputs it into the translation information management unit 34. The translation information management unit 34 deletes the translation information table entry including the use address "UA5" and the routing address "RA5" from the translation information table 32 based on the register/delete request message 3. Due to this, "user address UA5: routing address RA5" is deleted from the address translation information stored in the access router 30c as shown in FIG. 14. The translation information management unit 34 sets "On" to the field of the response flag of the received register/delete request message 3 and returns it to the address management device 10 via the I/F 31.

When acquiring the register/delete request message 3 that is a response to the register/delete request message 3 transmitted from the access router 30c via the I/F 11, the address management unit 14 transmits the same register/delete request message 3 as that transmitted to the access router 30c to the access router 30b via the I/F 11. The translation information management unit 34 of the access router 30b acquires the register/delete request message 3 via the I/F 31. The translation information management unit 34 deletes the translation information table entry including the user address "UA5" and the routing address "RA5" from the translation information table 32 based on the register/delete request message 3. Due to this, "user address UA5: routing address RA5" is deleted from the address translation information stored in the access router 30b as shown in FIG. 14. The translation information management unit 34 sets "On" to the field of the response flag of the received register/delete request message 3 and returns it to the address management device 10 via the I/F 31.

After acquiring the register/delete request message 3 that is a response to the register/delete request message 3 transmitted from the access router 30b via the I/F 11, the address management unit 14 deletes the address management table entry including the user address "UA5" and the routing address "RA5" from the address management table 12.

Figure 15:
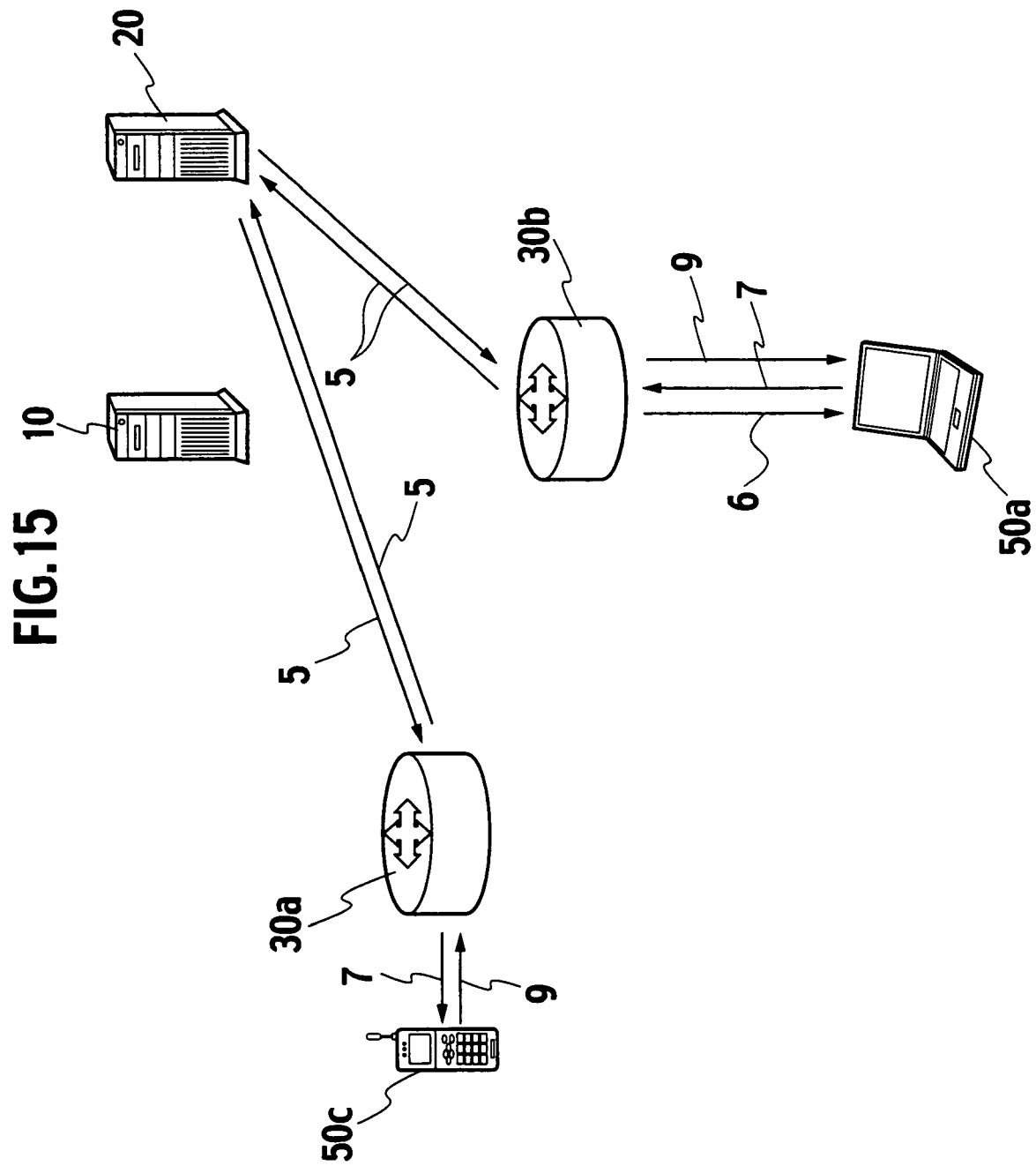
FIG. 15 is a diagram showing a process when a unique identifier is duplicated according to an embodiment of the present invention.

Next, the process when the unique identifier of the MIP terminal 50a is the same as that of the MIP terminal 50c already existing in the mobile communication system 100 and the unique identifier has been duplicated in the mobile communication system 100 is explained using FIG. 15. When the MIP terminal 50a connects to the access router 30b, as in the case shown in FIG. 12, the access router 30b provides the MIP terminal 50a with the advertisement information 6, and the MIP terminal 50a multicast-transmits the neighbor solicitation message 7 in the same link, thereby to transfer it to the access router 30b.

The translation information management unit 34 of the access router 30b generates the care-of address "UA5" expected to be generated by the MIP terminal 50a when the unique identifier of the MIP terminal 50a and the existing unique identifier are not duplicated, based on the neighbor solicitation message 7, and confirms whether or not the care-of address "UA5" exists in the translation information table 32. When the same care-of address does not exist in the translation information table 32, the translation information management unit 34 generates the duplication confirmation message 5 in which the care-of address "UA5" is set to the field of the care-of address and "Off" is set to the field of the response type flag and inputs it into the I/F 31. The I/F 31 transmits the duplication confirmation message 5 generated by the translation information management unit 34 to the roaming terminal management device 20.

The judgment unit 23 of the roaming terminal management device 20 acquires the duplication confirmation message 5 via the I/F 21. The judgment unit 23 acquires the unique identifier "a" of the MIP terminal 50a from the care-of address "UA5" set to the duplication confirmation message 5 and judges whether or not the same unique identifier exists in the terminal management table 22. When detecting that the same identifier as the unique identifier of the MIP terminal 50a exists in the terminal management table 22, the judgment unit 23 acquires the user address associated with the detected same unique identifier and the access router address from the terminal management table 22.

The judgment unit 23 generates the duplication confirmation message 5 in which the care-of address associated with the detected same unique identifier is set to the field of the care-of address and "Off" is set to the field of response type flag. The judgment unit 23 inputs the generated duplication confirmation message 5 into the I/F 21 and instructs to transmit it to the access router 30a having the access router address. The I/F 21 transmits the duplication confirmation message 5 to the access router 30a.

The translation information management unit 34 of the access router 30a acquires the duplication confirmation message 5 from the roaming terminal management device 20 via the I/F 31. The translation information management unit 34 acquires the unique identifier from the care-of address included in the duplication confirmation message 5, generates the neighbor solicitation message 7, and puts it into the I/F 31. The I/F 31 transmits the neighbor solicitation message 7 to the communication terminal such as the MIP terminal 50c existing in subordination to the access router 30a via an access point existing in subordination to the access router 30a.

Alternatively, the translation information management unit 34 generates the address "UA1" using the interface identifier acquired from the care-of address "UA5" included in the duplication confirmation message 5, and the global prefix of the access router 30a, and instructs the I/F 31 to transmit the neighbor solicitation message 7 to the generated address "UA1". The I/F 31 transmits the neighbor solicitation message 7 to the address "UA1" via an access point existing in subordination to the access router 30a.

Upon receipt of the neighbor solicitation message 7, the MIP terminal 50c having the same unique identifier as that of the MIP terminal 50a transmits a neighbor advertisement message 9 notifying that the identifier has been duplicated to the access router 30a When acquiring the neighbor advertisement message 9 via the I/F 31, the translation information management unit 34 of the access router 30a judges that the identifier of the MIP terminal 50a is a duplicate of the existing unique identifier and has been used by the MIP terminal 50c other than the MIP terminal 50a The translation information management unit 34 sets "Duplication flag" to the response type flag of the received duplication confirmation message 5 and returns it to the roaming terminal management device 20 via the I/F 31.

The I/F 21 of the roaming terminal management device 20 receives the duplication confirmation message 5 from the access router 30a and inputs it into the judgment unit 23. The judgment unit 23 judges that the reason why the same unique identifier as that of the MIP terminal 50a exists in the terminal management table 22 is that the unique identifier of the MIP terminal 50a connecting to the access router 30b is the same as the unique identifier of the MIP terminal 50c connecting to the access router 30a, based on the duplication confirmation message 5 in which the "Duplication flag" has been set. In other words, the judgment unit 23 judges that the unique identifier of the MIP terminal 50a is the same as the existing unique identifier of the existing terminal connecting to other access router, and has been duplicated. The judgment unit 23 inputs the result of the identifier duplication judgment into the terminal management unit 24.

The terminal management unit 24 generates the duplication confirmation message 5 in which the care-of address "UA5", which is a target of judgment, is set to the field of the care-of address and "Duplication flag" is set to the field of the response type flag, and transmits the duplication confirmation message 5 to the access router 30b via the I/F 21. In this manner, the terminal management unit 24 notifies the access router 30b of the result of the identifier duplication judgment made by the judgment unit 23. Due to this, the roaming terminal management device 20 does not permit the connection of the MIP terminal 50a to the access router 30b.

The I/F 31 of the access router 30b receives the duplication confirmation message 5 from the roaming terminal management device 20 and inputs it into the translation information management unit 34. The translation information management unit 34 generates the neighbor advertisement message 9 notifying the MIP terminal 50a that the unique identifier has been duplicated, based on the duplication confirmation message 5 in which "Duplication flag" has been set, and inputs it into the I/F 31. The I/F 31 transmits the neighbor advertisement message 9 to the MIP terminal 50a. Upon receipt of the neighbor advertisement message 9 from the access router 30b, the MIP terminal 50a ceases the generation of the care-of address and ends the communication start process.

Additionally, at the time point of having confirmed whether or not the same care-of address "UA5" exists in the translation information table 32 based on the neighbor solicitation message 7, the translation information management unit 34 of the access router 30b transmits the neighbor advertisement message 9 to the MIP terminal 50a without transmitting the duplication confirmation message 5 when having detected the same care-of address.

(Mobile Communication Method)

Next, a mobile communication method using the mobile communication system 100 is explained below. First, using FIG. 16, a procedure for confirming the uniqueness of the unique identifier of the MIP terminal 50a in the mobile communication system 100 when the MIP terminal 50a moves to the mobile communication system 100 and connects to the access router 30a (roaming-in) is explained.

When the MIP terminal 50a connects to the access router 30a, the access router 30a transmits the advertisement information 6 to the MIP terminal 50a (S101). The MIP terminal 50a multicast-transmits the neighbor solicitation message 7 including its own unique identifier in the same link, thereby to transmit it to the access router 30a (S102). The access router 30a generates a care-of address expected to be generated by the MIP terminal 50a when the unique identifier of the MIP terminal 50a and the existing unique identifier are not duplicates of each other based on the received neighbor solicitation message 7, and confirms whether or not the same care-of address exists in the translation information table 32. When the same care-of address does not exist in the translation information table 32, the access router 30a transmits the duplication confirmation message 5 to the roaming terminal management device 20 (S103).

The roaming terminal management device 20 acquires a unique identifier from the received duplication confirmation message 5 and judges whether or not the same unique identifier exists in the terminal management table 22. When the same unique identifier does not exist, the roaming terminal management device 20 judges that the existing routing address assigned to the MIP terminal 50a does not exist, and that the unique identifier of the MIP terminal 50a connecting to the access router 30a for the other reason than the handover differs from the existing unique identifier, and can be identified uniquely in the mobile communication system 100 (S104). The roaming terminal management device 20 transmits the duplication confirmation message 5 (response) for notifying that the unique identifier of the MIP terminal 50a has not been duplicated to the access router 30a as a response (S105).

The access router 30a generates a duplicate identifier confirmation state based on the received duplication confirmation message 5, and sets it to the judgment result storage unit 38 (S106). If the MIP terminal 50a does not receive the neighbor advertisement message 9 from the access router 30a even when the identifier duplication confirmation completion waiting time X has elapsed since the step (S102), the MIP terminal 50a generates a care-of address (S107). Then, the MIP terminal 50a transmits the user data packet 8a destined for the corresponding terminal 50b to the access router 30 using the generated care-of address (S108).

Figure 16:
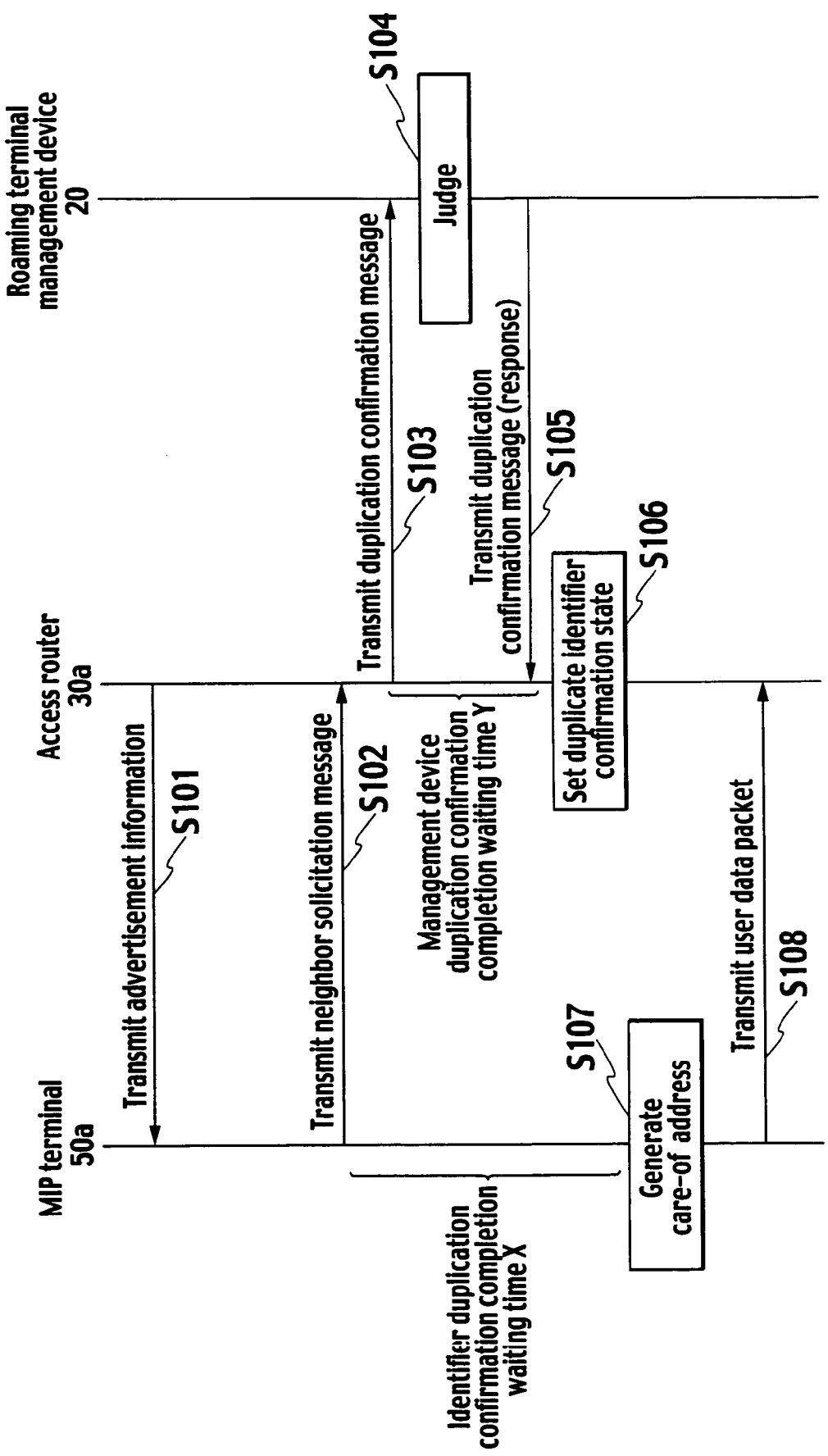
FIG. 16 is a sequence diagram showing a procedure for confirming the uniqueness of a unique identifier at the time of roaming-in according to an embodiment of the present invention.

Next, a procedure for assigning a routing address after the confirmation of the uniqueness of the unique identifier shown in FIG. 16 is explained below using FIG. 17. The access router 30a receives the user data packet 8a from the MIP terminal 50a (S201). The access router 30a stores the received user data packet 8a into the buffer 37 (S202). The access router 30a refers to the judgment result storage unit 38 and confirms the duplicate identifier confirmation state (S203). When the duplicate identifier confirmation state has been set, the access router 30a assigns a routing address to the care-of address of the MIP terminal 50a (S204). The access router 30a transmits the entry notification message 1 for notifying the care-of address of the MIP terminal 50a and the assigned routing address to the roaming terminal management device 20 (S205).

The roaming terminal management device 20 generates a terminal management table entry about the MIP terminal 50a based on the received entry notification message 1 and newly registers it in the terminal management table 22 (S206). After the registration, the roaming terminal management device 20 transfers the entry notification message 1 to the address management device 10 (S207). The address management device 10 generates an address management table entry about the MIP terminal 50a based on the received entry notification message 1 and newly registers it in the address management table 12 (S208). After the registration, the address management device 10 generates the register/delete request message 3 for instructing to register the care-of address of the MIP terminal 50a and the assigned routing address, and transmits it to the access router 30a (S209). The access router 30a generates a translation information table entry including the address translation information of the MIP terminal 50a based on the received register/delete request message 3, and newly registers it in the translation information table 32 (S210).

Figure 17:
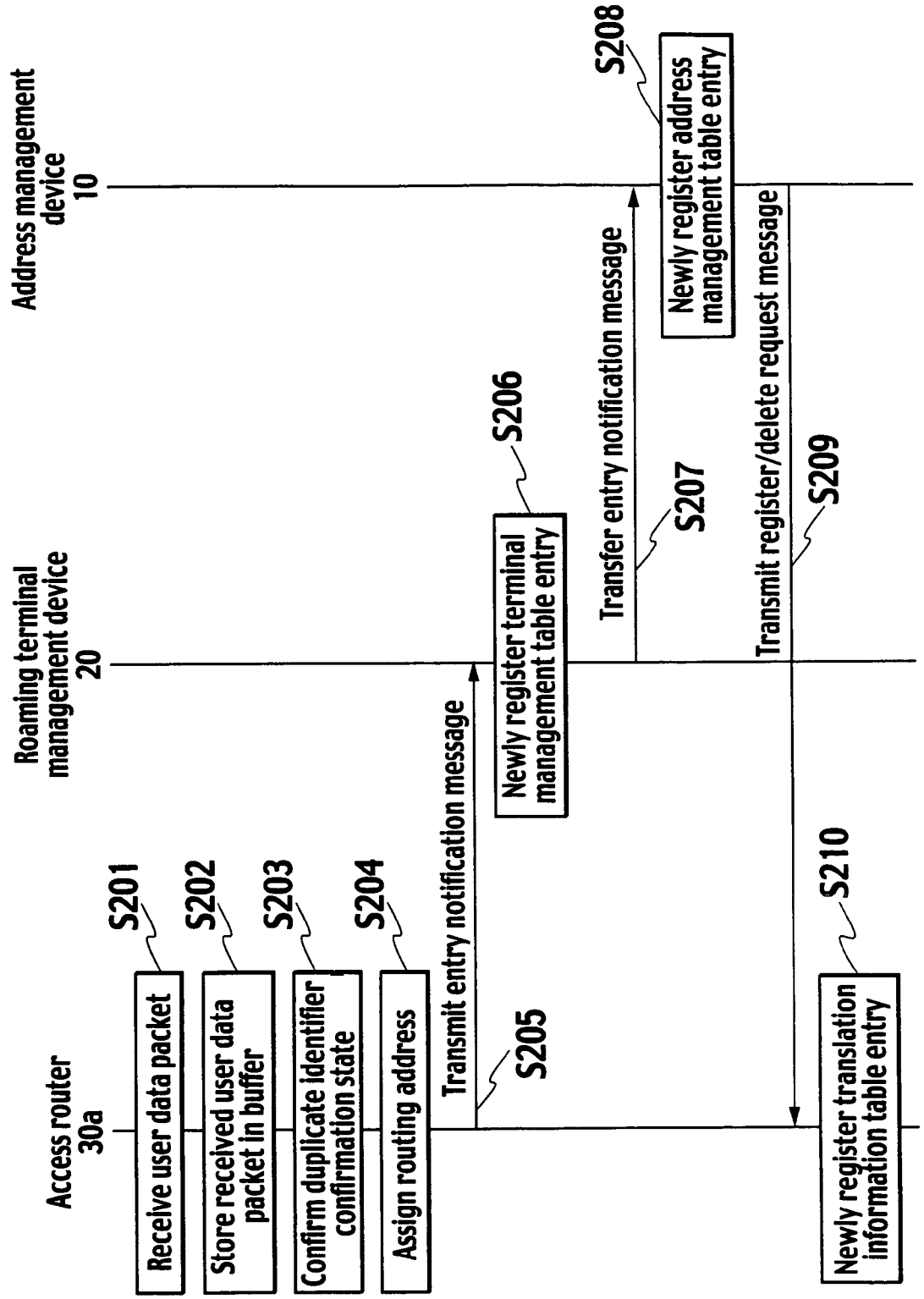
FIG. 17 is a sequence diagram showing a procedure for assigning a routing address according to an embodiment of the present invention.
Figure 18:
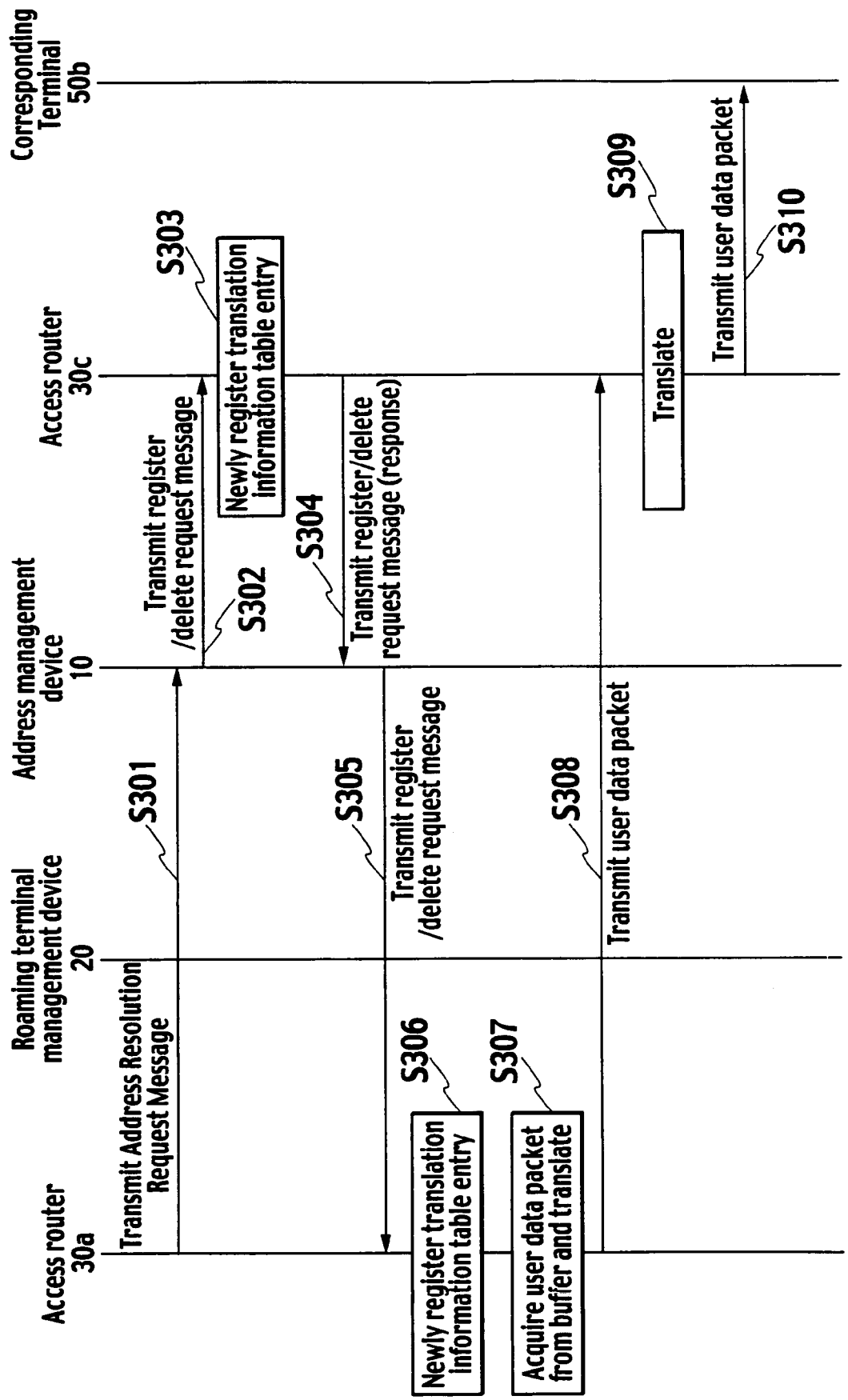
FIG. 18 is a sequence diagram showing a procedure for the address resolution and transfer of a user data packet according to an embodiment of the present invention.

Next, a procedure to be performed until an address resolution of the user data packet 8a is carried out to transfer it after the routing address is assigned as shown in FIG. 17 is explained using FIG. 18. When having not stored the address translation information including the user address of the corresponding terminal 50b set to the destination address of the buffered user data packet 8a, the access router 30a transmits the address resolution request message 2 to the address management device 10 (S301). The address management device 10 transmits the register/delete request message 3 for instructing to register the address translation information of the MIP terminal 50a to the access router 30c to which the corresponding terminal 50b being the destination of the user data packet 8 connects, based on the address resolution request message 2 (S302).

The access router 30c generates a translation information table entry including the address translation information of the MIP terminal 50a based on the received register/delete request message 3, and newly registers it in the translation information table 32 (S303). The access router 30c transmits the register/delete request message 3 (response) to the address management device 10 as a response (S304). Upon receipt of the response from the access router 30c, the address management device 10 generates the register/delete request message 3 for instructing to register the address translation information of the corresponding terminal 50b based on the address resolution request message 2, and transmits it to the access router 30a (S305).

The access router 30a generates a translation information table entry including the address translation information of the corresponding terminal 50b based on the register/delete request message 3, and newly registers it in the translation information table 32 (S306). The access router 30a acquires the user data packet 8a from the buffer 37 and translates the user address set to the destination address and the source address of the user data packet 8a into a routing address (S307). The access router 30a transmits the translated user data packet 8b to the access router 30c (S308). The access router 30c restores the user data packet to its original state by translating the routing address set to the destination address and the source address of the received user data packet 8b into the user address (S309). Then, the access router 30c transmits the user data packet 8a restored to its original state to the corresponding terminal 50b (S310).

In the step (S307), the access router 30a may encapsulate the user data packet 8a using the routing address. In such a case, the access router 30c may decapsulate and take out the user data packet 8a in the step (S309). In this case, the access router address of the access router 30c can be used as a routing address.

Figure 19:
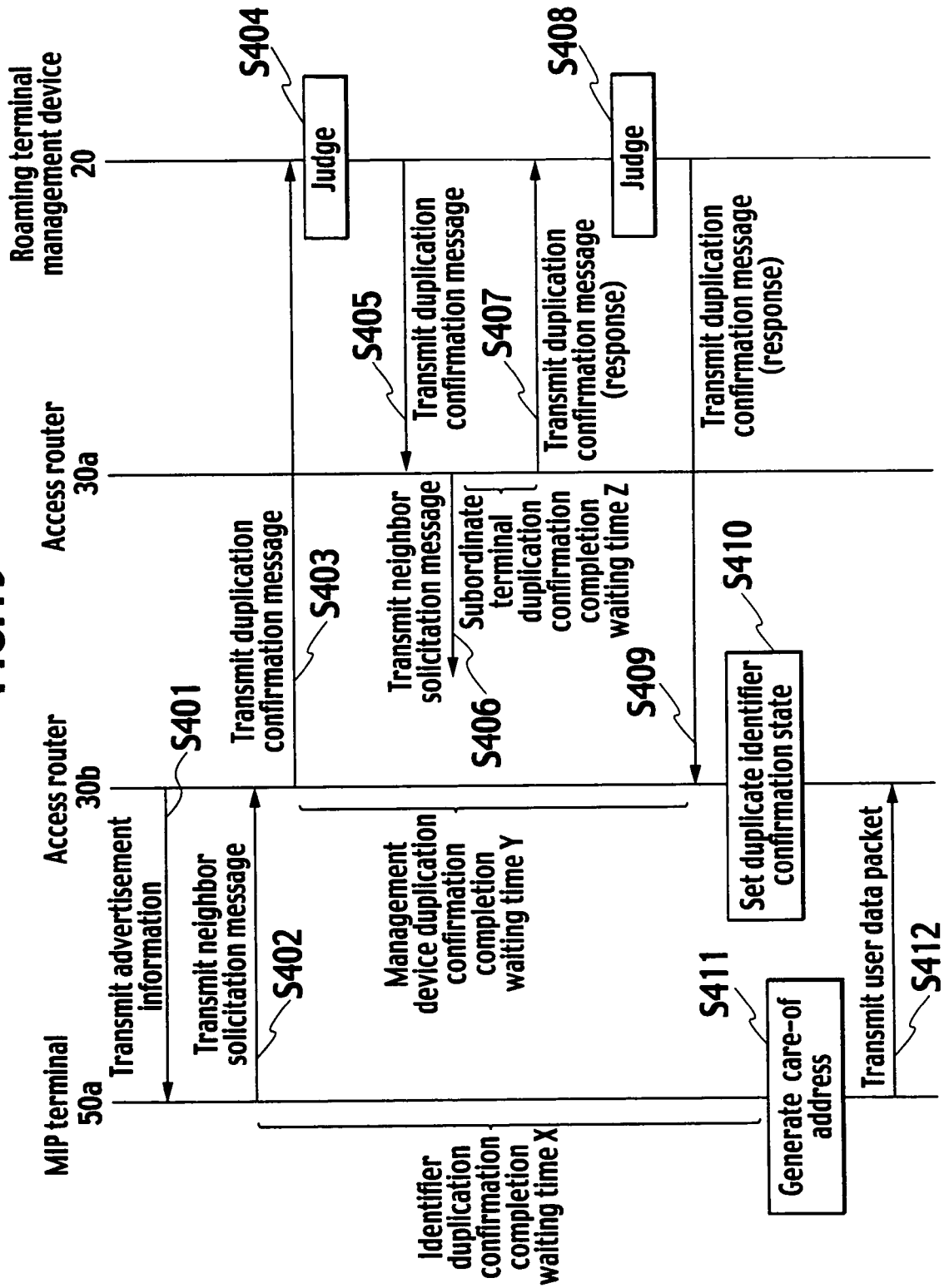
FIG. 19 is a sequence diagram showing a procedure to be performed until the generation of a care-of address when a handover is carried out according to an embodiment of the present invention.
Figure 20:
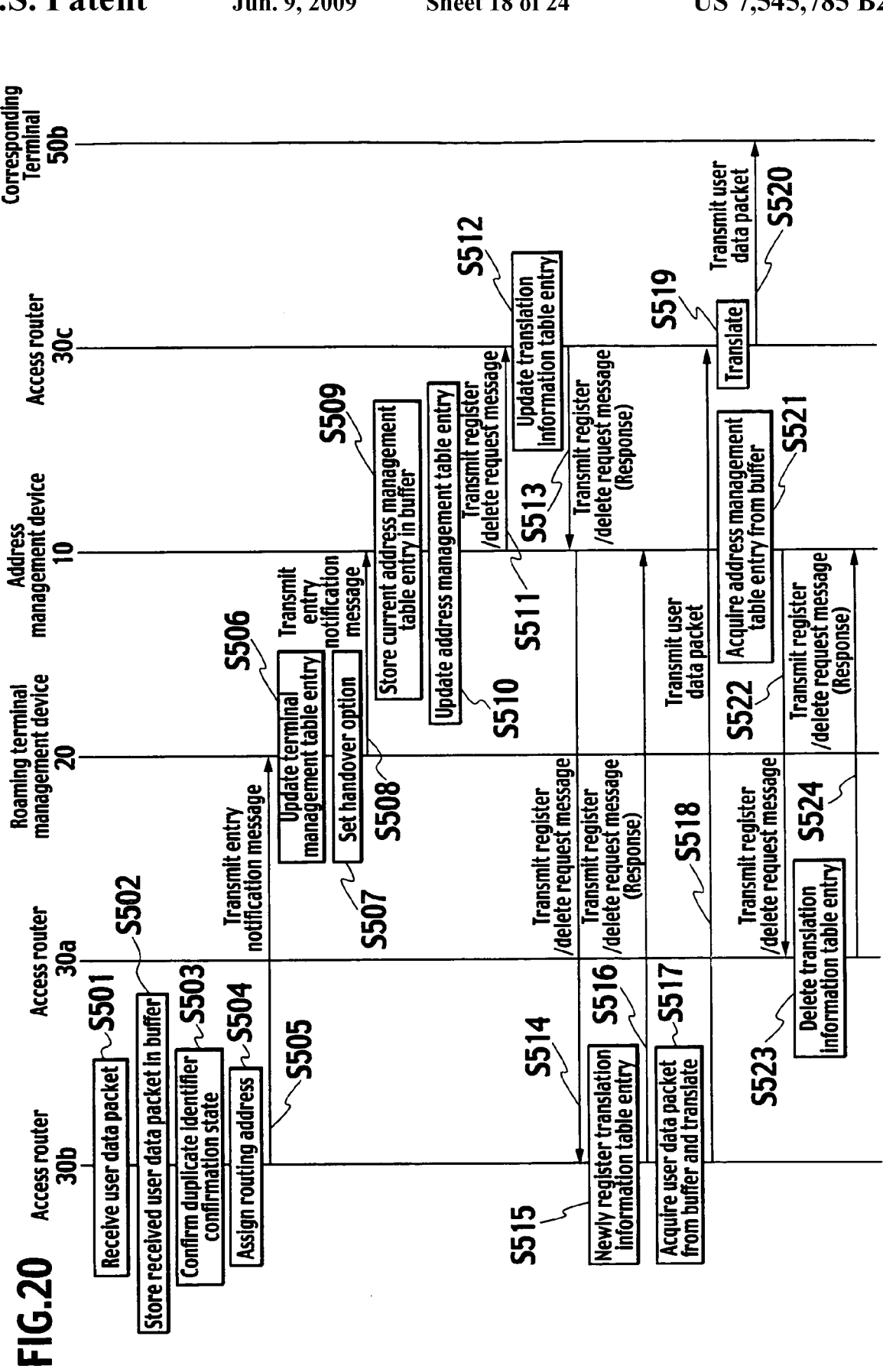
FIG. 20 is a sequence diagram showing a procedure for the transfer of a user data packet when a handover is carried out and for the deletion of the address translation information before the handover according to an embodiment of the present invention.

Next, a processing procedure in the case where the MIP terminal 50a in communication with the corresponding terminal 50b has carried out a handover to the access router 30b is explained using FIG. 19 and FIG. 20. FIG. 19 shows a procedure to be performed until the care-of address is generated, and FIG. 20 shows a procedure for transferring the user data packet, and for deleting the address translation information before the handover of the access router 30a.

When the MIP terminal 50a moves and connects to the access router 30b, the access router 30b transmits the advertisement information 6 to the MIP terminal 50a (S401), and the MIP terminal 50a multicast-transmits the neighbor solicitation message 7 in the same link, thereby to transmit it to the access router 30b (S402). The access router 30b generates a care-of address of the MIP terminal 50a expected to be generated by the MIP terminal 50a when the unique identifier of the MIP terminal 50a and the existing unique identifier are not duplicates of each other, based on the received neighbor solicitation message 7, and confirms whether or not the same care-of address exists in the translation information table 32. When the same care-of address does not exist in the translation information table 32, the access router 30b transmits the duplication confirmation message 5 to the roaming terminal management device 20 (S403).

The roaming terminal management device 20 acquires a unique identifier from the received duplication confirmation message 5 and judges whether or not the same unique identifier exists in the terminal management table 22 (S404). The roaming terminal management device 20 detects that the same unique identifier as the unique identifier of the MIP terminal 50a exists in the terminal management table 22. Then, the roaming terminal management device 20 generates the duplication confirmation message 5 based on the terminal management table entry in which the same unique identifier is included, and transmits it to the access router 30a (S405).

The access router 30a transmits the neighbor solicitation message 7 to the communication terminal existing in subordination to the access router 30a based on the received duplication confirmation message 5 (S406). At this time, the access router 30a may generate an address using the interface identifier acquired from the care-of address included in the duplication confirmation message 5, and the global prefix of the access router 30a, and may transmit the neighbor solicitation message 7 to the generated address. If the access router 30a does not receive the neighbor advertisement message 9 for the neighbor solicitation message 7 even when the subordinate terminal duplication confirmation completion waiting time Z has elapsed, the access router 30a transmits the duplication confirmation message 5 (response) for notifying that the unique identifier of the MIP terminal 50a is not duplicated to the roaming terminal management device 20 as a response (S407)

Upon receipt of the response from the access router 30a, the roaming terminal management device 20 judges that the reason why the same unique identifier as that of the MIP terminal 50a exists in the terminal management table 22 is that the existing routing address already assigned by the access router 30*a* (other access router) other than the access router 30*b* to which the MIP terminal 50*a* currently connects exists, and is not that the unique identifier of the MIP terminal 50*a* and the existing unique identifier are duplicates of each other. Further, the roaming terminal management device 20 judges that the MIP terminal 50*a* has carried out a handover from the access router 30*a* to the access router 30*b* (S408). Then, the roaming terminal management device 20 transmits the duplication confirmation message 5 (response) for notifying that the unique identifier of the MIP terminal 50*a* is not duplicated to the access router 30*b* as a response (S409).

The access router 30*b* generates a duplicate identifier confirmation state based on the received duplication confirmation message 5 and sets it to the judgment result storage unit 38 (S410). If the MIP terminal 50*a* does not receive the neighbor advertisement message 9 from the access router 30*b* even when the identifier duplication confirmation completion waiting time X has elapsed since the step (S402), the MIP terminal 50*a* generates a care-of address (S411). Then, the MIP terminal 50*a* transmits the user data packet 8*c* destined for the corresponding terminal 50*b* using the generated care-of address to the access router 30*b* (S412).

Then, as shown in FIG. 20, the access router 30*b* receives the user data packet 8*c* from the MIP terminal 50*a* (S501) and stores it in the buffer 37 (S502). The access router 30*b* refers to the judgment result storage unit 38 and confirms a duplicate identifier confirmation state (S503). When the duplicate identifier confirmation state has been set, the access router 30*b* assigns a new routing address to a new care-of address of the MIP terminal 50*a* (S504). The access router 30*b* transmits the entry notification message 1 for notifying the new care-of address and the routing address of the MIP terminal 50*a* to the roaming terminal management device 20 (S505).

The roaming terminal management device 20 updates the terminal management table entry including the unique identifier of the MIP terminal 50*a* to one including the information after the handover based on the entry notification message 1 (S506). The roaming terminal management device 20 sets the handover option 1*a* to the entry notification message 1 from the access router 30*b* (S507). The roaming terminal management device 20 transmits the entry notification message 1 to the address management device 10 (S508).

The address management device 10 temporarily stores the address management table entry about the MIP terminal 50*a* before the handover currently stored in the address management table 12 in the buffer 15, based on the handover option 1*a* of the received entry notification message 1 (S509). Then, the address management device 10 updates the address management table entry of the MIP terminal 50*a* to one including the information after the handover based on the received entry notification message 1 (S510). Further, the address management device 10 generates the register/delete request message 3 for instructing the access router 30*c*, to which the corresponding terminal 50*b* being correspondent of the MIP terminal 50*a*, connects to update the address translation information of the MIP terminal 50*a* changed through the handover, and transmits it to the access router 30*c* (S511).

The access router 30*c* updates the translation information table entry of the MIP terminal 50*a* changed through the handover based on the received register/delete request message 3 (S512). The access router 30*c* transmits the register/delete request message 3 (response) to the address management device 10 as a response (S513). Upon receipt of the response from the access router 30*c*, the address management device 10 generates the register/delete request message 3 for instructing the access router 30*b* to which the MIP terminal 50*a* currently connects, being a handover destination access router, to register the address translation information of the MIP terminal 50*a* and the address translation information of the corresponding terminal 50*b*, and transmits it to the access router 30*b* (S514).

The access router 30*b* newly registers the translation information table entry including the address translation information of the MIP terminal 50*a* and the translation information table entry including the address translation information of the corresponding terminal 50*b* into the translation information table 32 based on the register/delete request message 3 (S515). The access router 30*b* transmits the register/delete request message 3 (response) to the address management device 10 as a response (S516).

Then, the access router 30*b* acquires the user data packet 8*c* from the buffer 37 and translates the destination address and the source address into the routing address (S517). The access router 30*b* transmits the translated user data packet 8*d* to the access router 30*c* (S518). The access router 30*c* translates the destination address and the source address of the received user data packet 8*d* into the user address (S519) and transmits the user data packet 8*c* restored to its original state to the corresponding terminal 50*b* (S520).

In the step (S517), the access router 30*b* may encapsulate the user data packet 8*a* using the routing address. In such a case, the access router 30*c* may decapsulate and take out the user data packet 8*a* in the step (S519). In this case, the access router address of the access router 30*c* can be used as a routing address.

Further, the address management device 10 that has received the response from the access router 30*b* acquires the address management table entry before the handover of the MIP terminal 50*a* from the buffer 15 (S521). The address management device 10 generates the register/delete request message 3 for instructing the access router 30*a* from which the handover has been carried out to delete the address translation information of the MIP terminal 50*a* based on the address management table entry before the handover, and transmits it to the access router 30*a* (S522).

The access router 30*a* deletes the address translation information of the MIP terminal 50*a* that is no longer necessary because the MIP terminal 50*a* ceases existing in subordination thereto from the translation information table 32 based on the received register/delete request message 3 (S523). The access router 30*a* transmits the register/delete request message 3 (response) to the address management device 10 as a response (S524). In the steps (S522) and (S523), when it can be judged that the communication terminal in subordination to the access router 30*a*, which is in communication with the corresponding terminal 50*b*, does not exist any longer, the address management device 10 instructs to delete also the address translation information about the corresponding terminal 50*b*, and the access router 30*c* deletes it according to the instruction.

Figure 21:
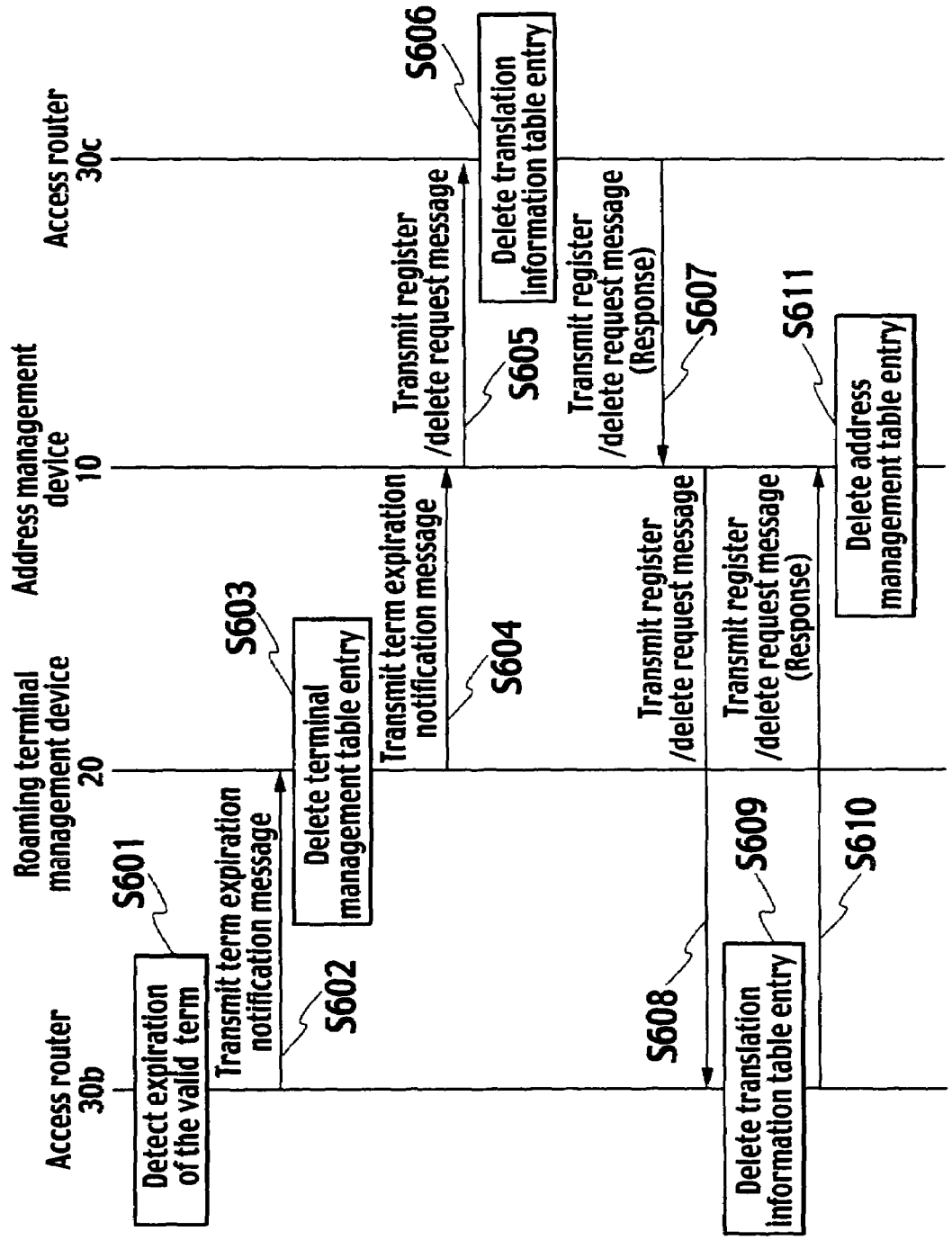
FIG. 21 is a sequence diagram showing a processing procedure when the valid term of address translation information has expired according to an embodiment of the present invention.

Next, a processing procedure in the case where the valid term of the address translation information stored in the access router 30*b* has expired is explained using FIG. 21. When detecting the expiration of the valid term of the address translation information of the MIP terminal 50*a* (S601), the access router 30*b* generates the term expiration notification message 4 and transmits it to the roaming terminal management device 20 (S602). The roaming terminal management device 20 deletes the terminal management table entry including the address translation information of the MIP terminal 50*a* from the terminal management table 22 based on the received term expiration notification message 4 (S603).

The roaming terminal management device 20 transmits the term expiration notification message 4 to the address management device 10 (S604).

The address management device 10 generates the register/delete request message 3 for instructing the access router 30c to which the corresponding terminal 50b being the correspondent of the MIP terminal 50a connects to delete the address translation information of the MIP terminal 50a the valid term of which has expired, based on the received term expiration notification message 4, and transmits it to the access router 30c (S605). The access router 30c deletes the translation information table entry including the address translation information of the MIP terminal 50a from the translation information table 32 based on the received register/delete request message 3 (S606). The access router 30c transmits the register/delete request message 3 (response) to the address management device 10 as a response (S607).

Upon receipt of the response from the access router 30c, the address management device 10 transmits the same register/delete request message 3 as that transmitted to the access router 30c to the access router 30b (S608). The access router 30b deletes the translation information table entry including the address translation information of the MIP terminal 50a from the translation information table 32 based on the received register/delete request message 3 (S609). The access router 30b transmits the register/delete request message 3 (response) to the address management device 10 as a response (S610). Upon receipt of the response from the access router 30b, the address management device 10 deletes the address management table entry about the MIP terminal 50a from the address management table 12 (S611).

Figure 22:
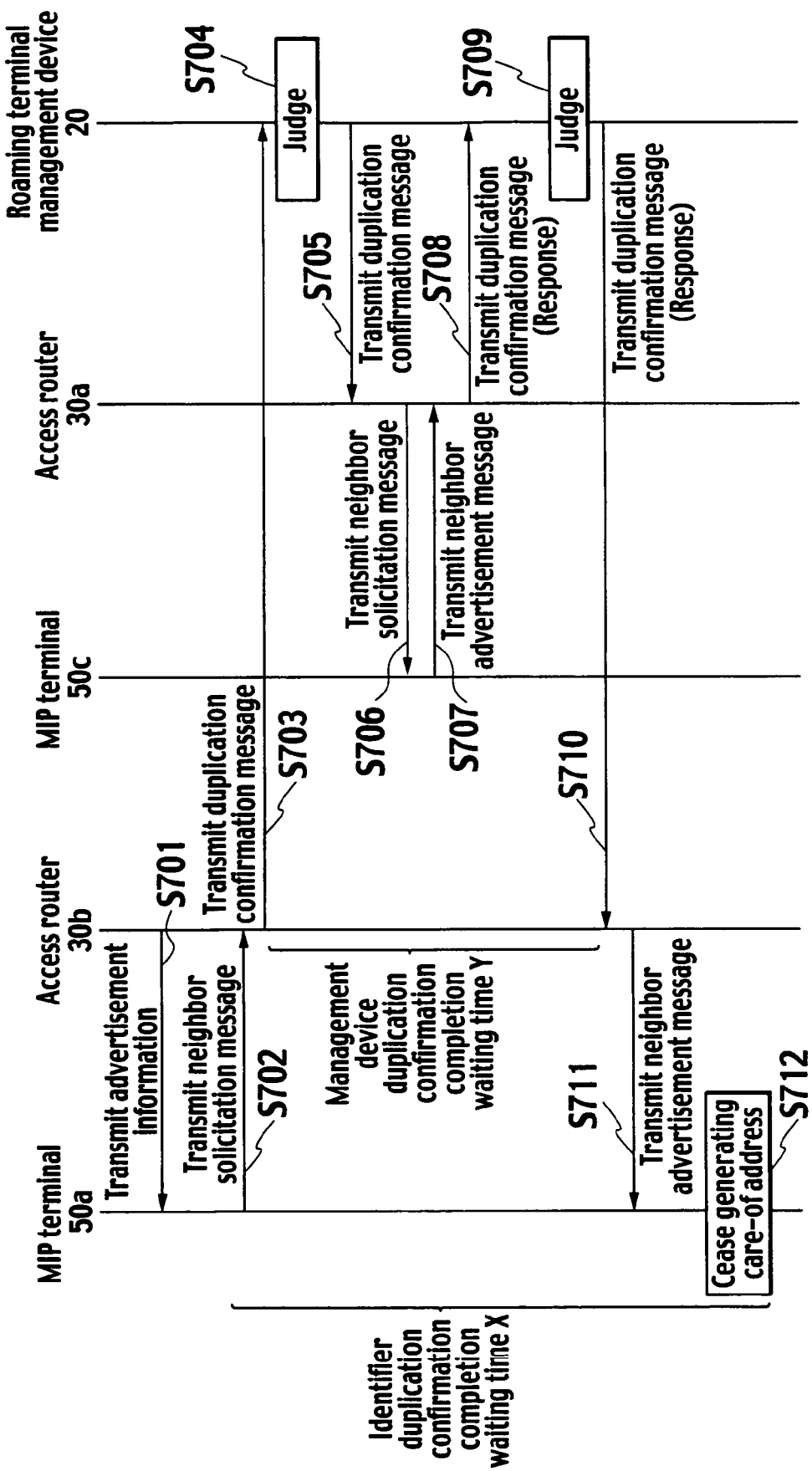
FIG. 22 is a sequence diagram showing a processing procedure when an MIP terminal having the same unique identifier as the existing unique identifier connects to a mobile communication system according to an embodiment of the present invention.
Figure 23:
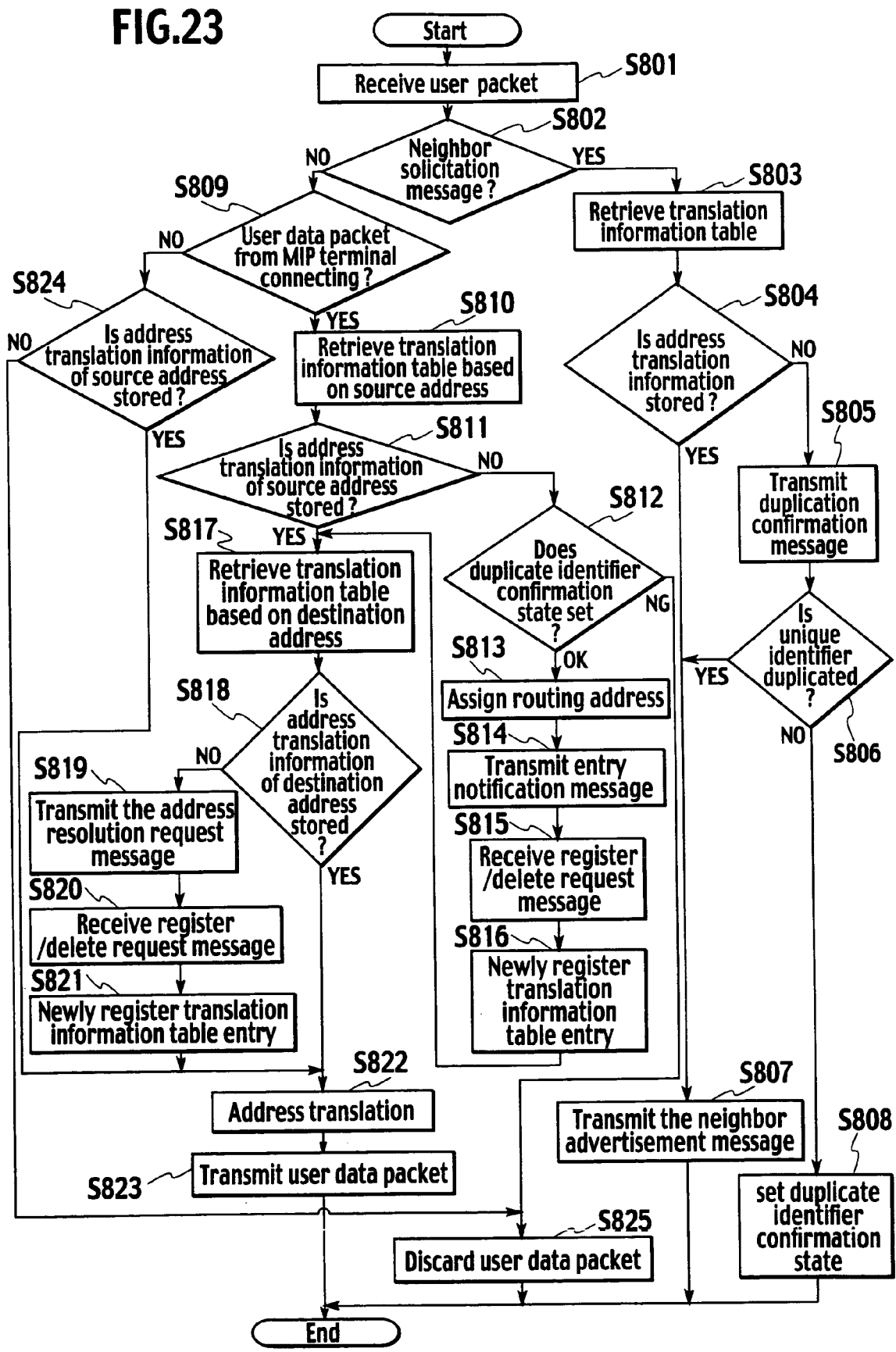
FIG. 23 is a flow chart showing a processing procedure when an access router receives a user data packet according to an embodiment of the present invention.

Next, a processing procedure in the case where the MIP terminal 50a has connected to the mobile communication system 100 when the unique identifier of the MIP terminal 50a is the same as that of the MIP terminal 50c already existing in the mobile communication system 100 is explained using FIG. 22. First, steps (S701) to (S705) similar to the steps (S401) to (S405) shown in FIG. 19 are carried out.

The access router 30a transmits the neighbor solicitation message 7 to the communication terminal such as the MIP terminal 50c existing in subordination to the access router 30a based on the received duplication confirmation message 5 (S706). At this time, the access router 30a may generate an address using the interface identifier acquired from the care-of address included in the duplication confirmation message 5, and the global prefix of the access router 30a, and may transmit the neighbor solicitation message 7 to the generated address.

Upon receipt of the neighbor solicitation message 7, the MIP terminal 50c transmits the neighbor advertisement message 9 to the access router 30a (S707). By receiving the neighbor advertisement message 9, the access router 30a judges that the unique identifier of the MIP terminal 50a is a duplicate of the existing unique identifier and has been used by the MIP terminal 50c other than the MIP terminal 50a. Then, the access router 30a transmits the duplication confirmation message 5 (response) for notifying that the unique identifier of the MIP terminal 50a and the existing unique identifier are duplicates of each other to the roaming terminal management device 20 as a response (S708).

Upon receipt of the response from the access router 30a, the roaming terminal management device 20 judges that the unique identifier of the MIP terminal 50a connecting to the access router 30b is the same as the unique identifier of the MIP terminal 50c connecting to the access router 30a and is a duplicate of the existing unique identifier (S709). Then, the roaming terminal management device 20 transmits the duplication confirmation message 5 (response) for notifying that the unique identifier of the MIP terminal 50a and the existing unique identifier are duplicates of each other to the access router 30b as a response (S710).

The access router 30b transmits the neighbor advertisement message 9 to the MIP terminal 50a based on the received duplication confirmation message 5 (S711). Upon receipt of the neighbor advertisement message 9 from the access router 30b, the MIP terminal 50a ceases generating the care-of address and completes the communication start process (S712).

Next, processes carried out by the access routers 30a to 30c, the roaming terminal management device 20, and the address management device 10, respectively, are explained using FIG. 23 to FIG. 26. First, using FIG. 23, a processing procedure when the access routers 30a to 30c receive the user packet is explained.

First, the access routers 30a to 30c receive the user packet (S801). The access routers 30a to 30c judge whether or not the received user packet is the neighbor solicitation message 7 of a user control data packet (S802). When it has been judged in the step (S802) that it is the neighbor solicitation message 7, the access routers 30a to 30c retrieve the translation information table 32 based on the care-of address of the MIP terminal 50a that has transmitted the neighbor solicitation message 7 (S803), and judges whether or not the address translation information of the MIP terminal 50a is stored (S804).

When it has been judged in the step (S804) that the address translation information is not stored in the translation information table 32, the access routers 30a to 30c transmit the duplication confirmation message 5 to the roaming terminal management device 20 (S805). The access routers 30a to 30c judge whether or not the unique identifier is duplicated based on the duplication confirmation message 5 (response) received from the roaming terminal management device 20 (S806).

When it has been judged in the step (S804) that the address translation information is stored in the translation information table 32, or when it has been judged in the step (S806) that the unique identifier is duplicated, the access routers 30a to 30c transmit the neighbor advertisement message 9 to the MIP terminal (S807). On the other hand, when it has been judged in the step (S806) that the unique identifier is duplicated, the access routers 30a to 30c set a duplicate identifier confirmation state to the judgment result storage unit 38 (S808).

When it has been judged in the step (S802) that the received user packet is not the neighbor solicitation message 7 but the user data packet 8a, the access routers 30a to 30c judge whether or not it is the user data packet 8a from the MIP terminal 50a connected to its own and existing in subordination to its own (S809). When it has been judged in the step (S809) that it is the user data packet 8a from the MIP terminal 50a existing in subordination to its own, the access routers 30a to 30c retrieve the translation information table 32 based on the source address set to the user data packet 8a (S810), and judges whether or not the address translation information of the MIP terminal 50a is stored (S811).

When it has been judged in the step (S811) that the address translation information is not stored in the translation information table 32, the access routers 30a to 30c confirm whether or not a duplicate identifier confirmation state has been set (S812). If it can be confirmed in the step (S812) that the duplicate identifier confirmation state has been set, the access routers 30a to 30c assign a routing address to the care-of address of the source address (S813). Then, the access routers 30a to 30c transmit the entry notification message 1 including the care-of address and the assigned routing address to the roaming terminal management device 20 (S814). After this, the access routers 30a to 30c receive the register/delete request message 3 for instructing to register the care-of address and the assigned routing address from the address management device 10 (S815). The access routers 30a to 30c newly register the translation information table entry based on the received register/delete request message 3 (S816).

When it has been judged in the step (S811) that the address translation information is stored in the translation information table 32, or when the step (S816) is completed, the access routers 30a to 30c retrieve the translation information table 32 based on the destination address set to the user data packet 8a (S817), and judges whether or not the address translation information of the communication terminal 50b, being the destination of the user data packet, is stored (S818).

When it has been judged in the step (S818) that the address translation information is not stored in the translation information table 32, the access routers 30a to 30c transmit the address resolution request message 2 (S819). Then, the access routers 30a to 30c receive the register/delete request message 3 from the address management device 10 (S820). The access routers 30a to 30c newly register the translation information table entry based on the received register/delete request message 3 (S821).

When it has been judged in the step (S818) that the address translation information is stored in the translation information table 32, or when the step (S821) is completed, the access routers 30a to 30c translate the destination address and the source address of the user data packet 8a into a routing address based on the address translation information (S822). Then the access routers 30a to 30c transmit the translated user data packet 8b (S823).

On the other hand, when it has been judged in the step (S809) that the user data packet 8a is not from the MIP terminal 50a existing in subordination to its own, the access routers 30a to 30c judge whether or not the address translation information of the source address of the user data packet 8a is stored (S824). When it has been judged in the step (S824) that the address translation information is stored, the access routers 30a to 30c advance to the step (S822), translate and transmit the user data packet 8a. When it has been judged in the step (S824) that the address translation information is not stored, or when it cannot be confirmed in the step (S812) that the duplicate identifier confirmation state has been set, the access routers 30a to 30c discard the user data packet 8a (S825).

Figure 24:
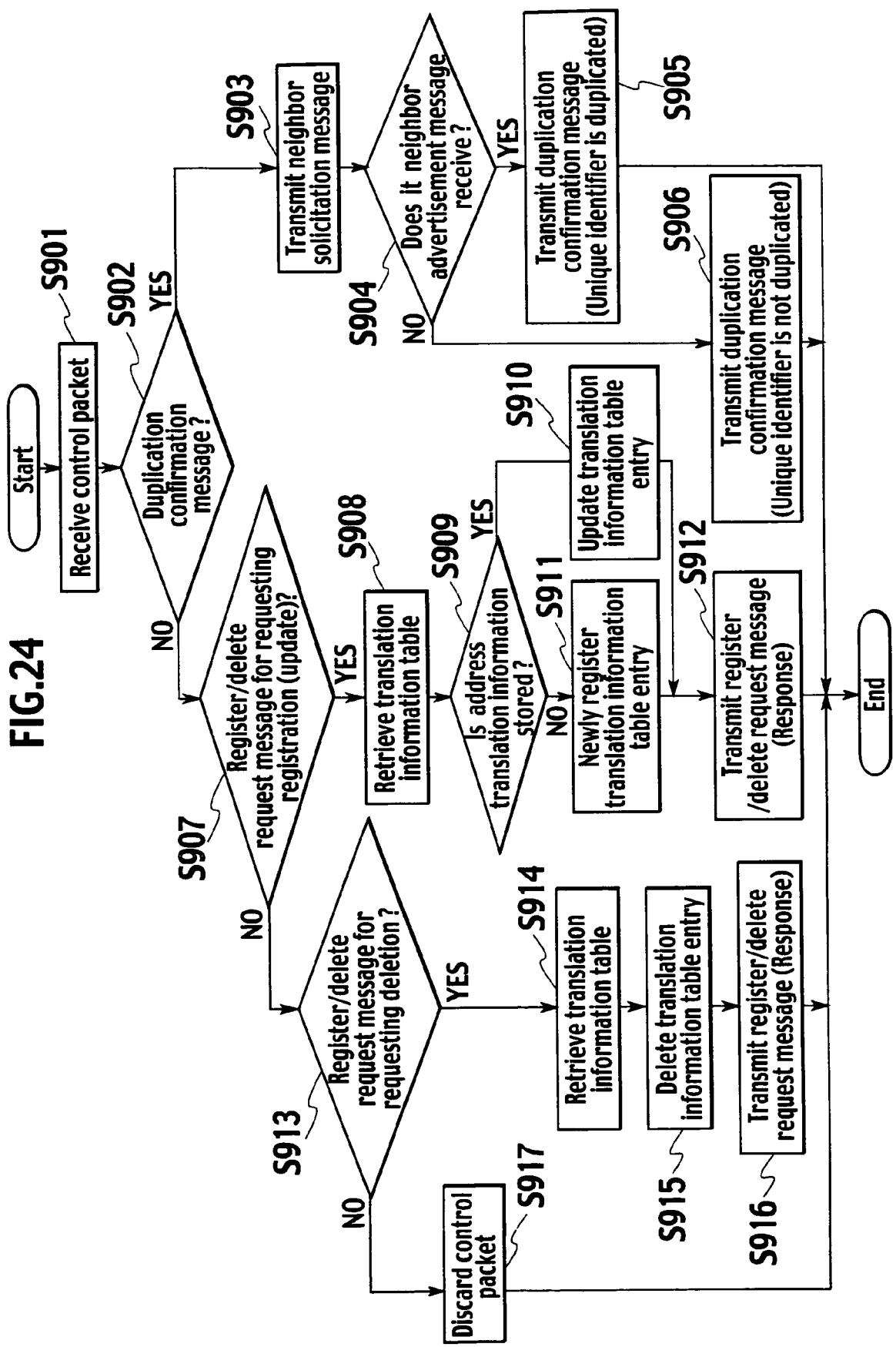
FIG. 24 is a flow chart showing a processing procedure when an access router receives a control packet according to an embodiment of the present invention.

Next, using FIG. 24, a processing procedure in the case where the access routers 30a to 30c receive the control packet is explained. First, the access routers 30a to 30c receive the control packet (S901). The access routers 30a to 30c judge whether or not the received control packet is the duplication confirmation message 5 from the roaming terminal management device 20 (S902). When it has been judged in the step (S902) that it is the duplication confirmation message 5, the access routers 30a to 30c transmit the neighbor solicitation message 7 to the subordinate communication terminal (S903).

The access routers 30a to 30c judge whether or not the neighbor advertisement message 9 has been received from the subordinate communication terminal before the subordinate terminal duplicate confirmation completion waiting time Z elapsed (S904). In the step (S904), when the neighbor advertisement message 9 has been received before the time elapsed, the access routers 30a to 30c transmit the duplication confirmation message 5 for notifying that the unique identifier of the MIP terminal 50a is duplicated to the roaming terminal management device 20 (S905). In the step (S904), when the neighbor advertisement message 9 has not been received before the time elapsed, the access routers 30a to 30c transmit the duplication confirmation message 5 for notifying that the unique identifier of the MIP terminal 50a is not duplicated to the roaming terminal management device 20 (S906).

When it has been judged in the step (S902) that the received control packet is not the duplication confirmation message 5, the access routers 30a to 30c judge whether or not the received control packet is the register/delete request message 3 for requesting the registration or update of the address translation information (S907). When it has been judged in the step (S907) that the received control packet is the register/delete request message 3 for requesting the registration or update, the access routers 30a to 30c retrieve the translation information table 32 based on the register/delete request message 3 (S908) and judge whether or not the target address translation information is stored (S909).

When it has been judged in the step (S909) that the target address translation information is stored in the translation information table 32, the access routers 30a to 30c update the translation information table entry based on the register/delete request message 3 (S910). When it has been judged in the step (S909) that the target address translation information is not stored in the translation information table 32, the access routers 30a to 30c newly register the translation information table entry based on the register/delete request message 3 (S911). Then, following the steps (S910) and (S911), the access routers 30a to 30c transmit the register/delete request message 3 (response) to the address management device 10 (S912).

When it has been judged in the step (S907) that the control packet is not the register/delete request message 3 for requesting the registration or update of the address translation information, the access routers 30a to 30c judge whether or not the control packet is the register/delete request message 3 for requesting the deletion of the address translation information (S913). When it has been judged in the step (S913) that the control packet is the register/delete request message 3 for requesting the deletion of the address translation information, the access routers 30a to 30c retrieve the translation information table 32 based on the register/delete request message 3 (S914) and deletes the translation information table entry including the target address translation information (S915). Then, the access routers 30a to 30c transmit the register/delete request message 3 (response) to the address management device 10 (S916). On the other hand, when it has been judged in the step (S913) that the control packet is also not the register/delete request message 3 for requesting the deletion, the access routers 30a to 30c discard the control packet (S917).

Figure 25:
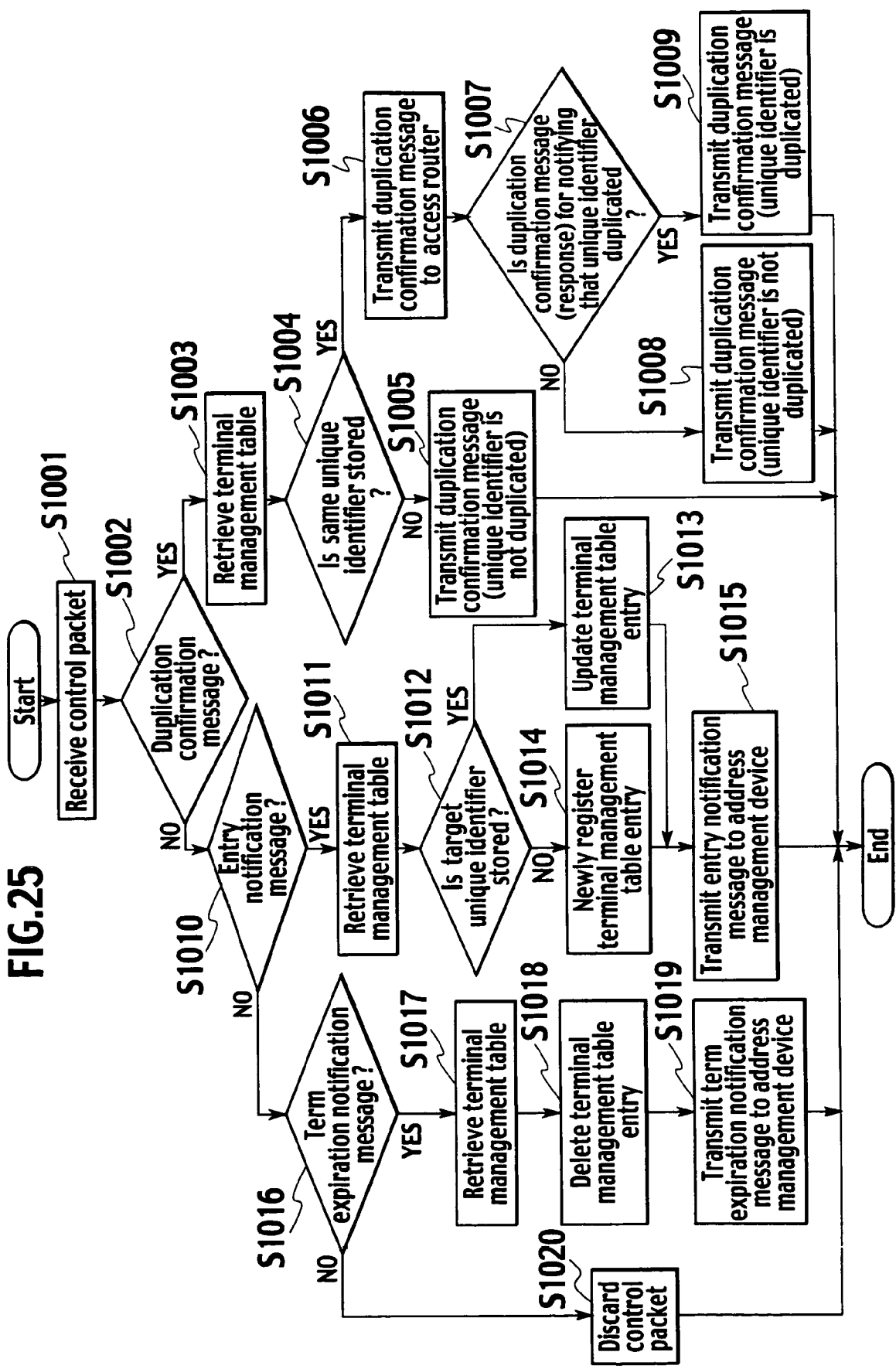
FIG. 25 is a flow chart showing a processing procedure of a roaming terminal management device according to an embodiment of the present invention.

Next, the process carried out by the roaming terminal management device 20 is explained using FIG. 25. First, the roaming terminal management device 20 receives the control packet (S1001). The roaming terminal management device 20 judges whether or not the control packet is the duplication confirmation message 5 (S1002). When it has been judged in the step (S1002) that the control packet is the duplication confirmation message 5, the roaming terminal management device 20 retrieves the terminal management table 22 based on the duplication confirmation message 5 (S1003) and judges whether or not the same unique identifier as the target unique identifier is stored (S1004).

When it has been judged in the step (S1004) that the same unique identifier is not stored, the roaming terminal management device 20 transmits the duplication confirmation message 5 (response) for notifying that the unique identifier is not duplicated to the access router 30b that has transmitted the duplication confirmation message 5 (S1005). On the other hand, when it has been judged in the step (S1004) that the same unique identifier is stored, the roaming terminal management device 20 transmits the duplication confirmation message 5 to the access router 30a having the access router address associated with the unique identifier (S1006).

The roaming terminal management device 20 judges whether or not the duplication confirmation message 5 (response) received from the access router 30a that has transmitted the duplication confirmation message 5 is one for notifying that the unique identifier is duplicated (S1007). When it has been judged in the step (S1007) that the duplication confirmation message 5 is one for notifying that the unique identifier is not duplicated, the roaming terminal management device 20 transmits the duplication confirmation message 5 (response) for notifying that the unique identifier is not duplicated to the access router 30b that has transmitted the duplication confirmation message 5 (S1008). On the other hand, when it has been judged in the step (S1007) that the duplication confirmation message 5 is one for notifying that the unique identifier is duplicated, the roaming terminal management device 20 transmits the duplication confirmation message 5 (response) for notifying that the unique identifier is duplicated to the access router 30b that has transmitted the duplication confirmation message 5 (S1009).

When it has been judged in the step (S1002) that the control packet is not the duplication confirmation message 5, the roaming terminal management device 20 judges whether or not the control packet is the entry notification message 1 (S1010). When it has been judged in the step (S1010) that the control packet is the entry notification message 1, the roaming terminal management device 20 retrieves the terminal management table 22 based on the entry notification message 1 (S1011) and judges whether or not the target unique identifier is stored (S1012).

When it has been judged in the step (S1012) that the target unique identifier is stored in the terminal management table 22, the roaming terminal management device 20 updates the terminal management table entry based on the entry notification message 1 (S1013). When it has been judged in the step (S1012) that the target unique identifier is not stored in the terminal management table 22, the roaming terminal management device 20 newly registers the terminal management table entry based on the entry notification message 1 (S1014). Then, following the steps (S1013) and (S1014), the roaming terminal management device 20 transmits the entry notification message 1 to the address management device 10 (S1015).

When it has been judged in the step (S1010) that the control packet is not the entry notification message 1, the roaming terminal management device 20 judges whether or not the control packet is the term expiration notification message 4 (S1016). When it has been judged in the step (S1016) that the control packet is the term expiration notification message 4, the roaming terminal management device 20 retrieves the terminal management table 22 based on the term expiration notification message 4 (S1017) and deletes the terminal management table entry including the target unique identifier (S1018). Then, the roaming terminal management device 20 transmits the term expiration notification message 4 to the address management device 10 (S1019). On the other hand, when it has been judged in the step (S1016) that the control packet is not the term expiration notification message 4, the roaming terminal management device 20 discards the control packet (S1020).

Figure 26:
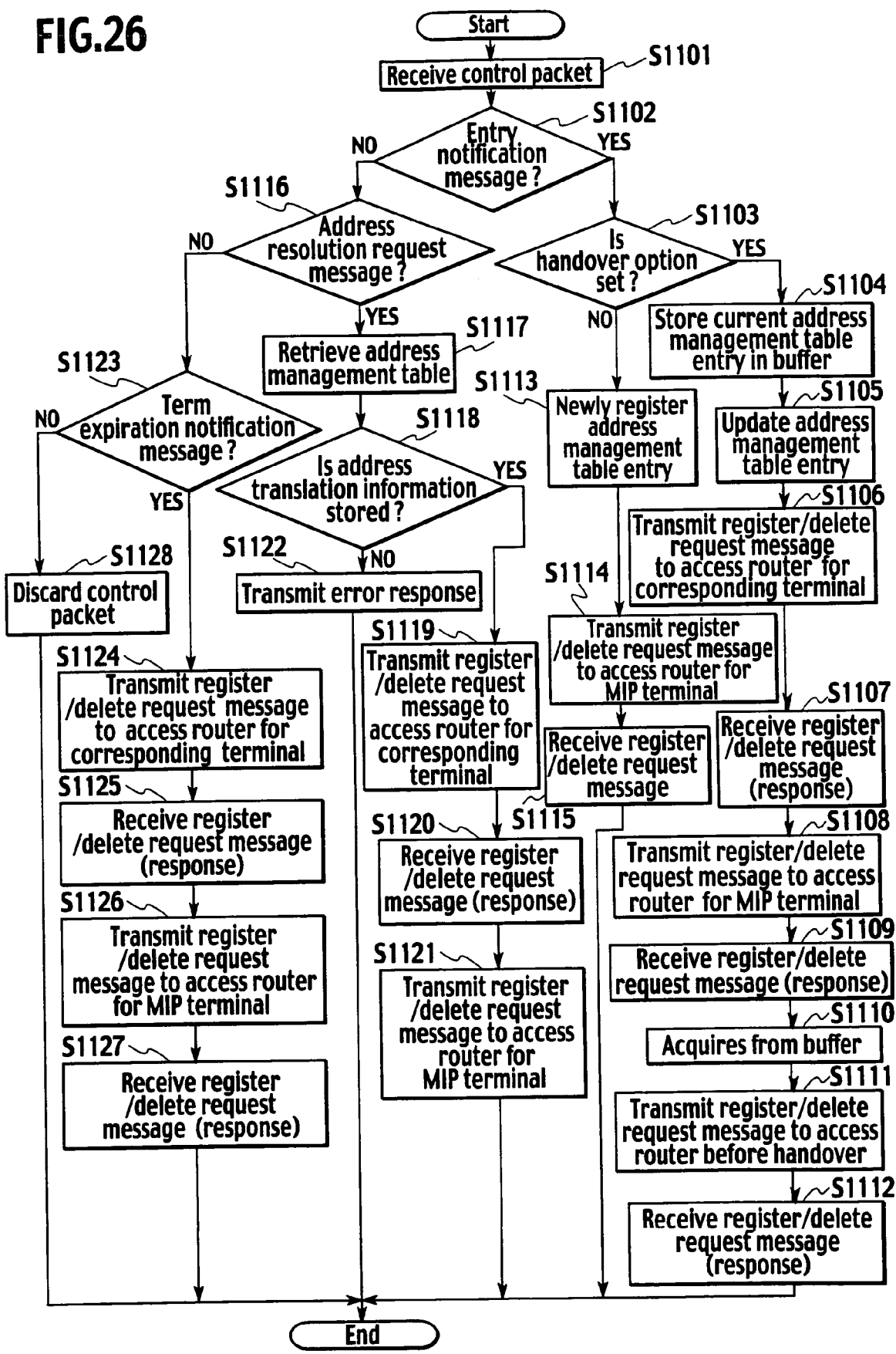
FIG. 26 is a flow chart showing a processing procedure of an address management device according to an embodiment of the present invention.

Next, the processing procedure carried out by the address management device 10 is explained using FIG. 26. First, the address management device 10 receives the control packet (S1101). The address management device 10 judges whether or not the control packet is the entry notification message 1 (S1102). When it has been judged in the step (S1102) that the control packet is the entry notification message 1, the address management device 10 judges whether or not the handover option 1a is set (S1103).

When it has been judged in the step that the handover option 1a is set (S1103), the address management device 10 stores the current address management table entry including the target care-of address in the buffer 15 (S1104). In other words, it stores the address management table entry before the handover in the buffer 15. Then, the address management device 10 updates the address management table entry based on the entry notification message 1 (S1105). The address management device 10 transmits the register/delete request message 3 for instructing to register the address translation information of the MIP terminal 50a being the source of the user data packet 8, to the access router 30c to which the corresponding terminal 50b connects (S1106), and receives the register/delete request message 3 (response) corresponding thereto (S1107).

The address management device 10 transmits the register/delete request message 3 for instructing to register the address translation information of the corresponding terminal 50b and the address translation information of the MIP terminal 50a to the access router 30b to which the MIP terminal 50a being the source of the user data packet 8a, connects (S1108), and receives the register/delete request message 3 (response) corresponding thereto (S1109). The address management device 10 acquires the address management table entry before the handover from the buffer 15 (S1110). The address management device 10 transmits the register/delete request message 3 for instructing to delete the address translation information before the handover to the access router 30a before the handover, based on the acquired address management table entry (S1111), and receives the register/delete request message 3 (response) corresponding thereto (S1112). At this time, when it can be judged that the communication terminal in communication with the corresponding terminal does not exist any longer in subordination to the access router 30a before the handover, the address management device 10 transmits the register/delete request message 3 for instructing to also delete the address translation information about the corresponding terminal.

On the other hand, when it has been judged in the step (S1103) that the handover option 1a is not set, the address management device 10 newly registers the address management table entry based on the entry notification message 1 (S1113). Then, the address management device 10 transmits the register/delete request message 3 for instructing to register the address translation information of the MIP terminal 50a being the source of the user data packet 8a, to the access router 30b to which the MIP terminal 50a connects (S1114), and receives the register/delete request message 3 (response) corresponding thereto (S1115).

Alternatively, when it has been judged in the step (S1102) that the control packet is not the entry notification message 1, the address management device 10 judges whether or not it is the address resolution request message 2 (S1116). When it has been judged in the step (S1116) that the control packet is the address resolution request message 2, the address management device 10 retrieves the address management table 12 (S1117) and judges whether or not the address translation information of the corresponding terminal is stored (S1118).

When it has been judged in the step (S1118) that the address translation information of the corresponding terminal is stored, the address management device 10 transmits the register/delete request message 3 for instructing to register the address translation information of the MIP terminal 50a being the source of the user data packet 8a, to the access router to which the corresponding terminal connects (S1119), and receives the register/delete request message 3 (response) corresponding thereto (S1120). Then, the address management device 10 transmits the register/delete request message 3 for instructing to register the address translation information of the corresponding terminal to the access router 30b to which the MIP terminal 50a connects (S1121).

On the other hand, when it has been judged in the step (S1118) that the address translation information of the corresponding terminal is not stored, the address management device 10 sets an error response flag indicating that the address resolution is failure to the field of the option information of the address resolution request message 2, and transmits it to the access router 30b that has transmitted the address resolution request message 2 (S1122).

Alternatively, when it has been judged in the step (S1116) that the control packet is not also the address resolution request message 2, the address management device 10 judges whether or not the control packet is the term expiration notification message 4 (S1123). When it has been judged in the step (S1123) that it is the term expiration notification message 4, the address management device 10 transmits the register/delete request message 3 for instructing to delete the address translation information of the MIP terminal 50a being the source of the user data packet 8a, to the access router 30c to which the corresponding terminal 50b connects (S1124), and receives the register/delete request message 3 (response) corresponding thereto (S1125).

Then, the address management device 10 transmits the register/delete request message 3 for instructing to delete the address translation information of the MIP terminal 50a to the access router 30b to which the MIP terminal 50a connects (S1126), and receives the register/delete request message 3 (response) corresponding thereto (S1127). On the other hand, when it has been judged in the step (S1123) that the control packet is not also the term expiration notification message 4, the address management device 10 discards the control packet (S1128).

According to the mobile communication system 100, the management device 40, the access routers 30a to 30c, and the mobile communication method described above, the access routers 30a to 30c, upon receipt of the user data packet 8a in which the transient address such as the care-of address is set to the source address from the MIP terminal 50a connecting thereto, assign a routing address to the care-of address and store the address translation information. Therefore, in the mobile communication system 100, it is possible for the access routers 30a to 30c to assign the routing address to the care-of address, and to transfer the user data packet 8a even when the transient address such as the care-of address is used as a user address. Further, it is not necessary to add a new function to the MIP terminal 50a.

Furthermore, the management device 40 judges whether or not the existing routing address assigned to the MIP terminal 50a by an access router other than the access router to which the MIP terminal 50a connects exists, based on the unique identifier of the MIP terminal 50a, and judges whether or not a handover is carried out Because of this, it is possible for the management device 40 to uniquely identify the MIP terminal 50a by using the unique identifier even if the care-of address changes through a handover, and to detect that the handover is carried out based on existence or nonexistence of the existing routing address of the identified MIP terminal 50a.

Further, when having detected the handover, it is possible for the management device 40 to instruct other access router to delete the existing correspondence between the care-of address (previous transient address) used by the MIP terminal 50a while in connection to other access router, and the existing routing address. Therefore, in the mobile communication system 100, when the MIP terminal 50a moves and connects to the new access router 30b, it is possible to update the address translation information stored in the access router 30b being a handover destination access router, or the access router 30c, to which the corresponding terminal connects, to the new address translation information after the handover, and at the same time, to delete the address translation information (existing correspondence), which is no longer necessary, stored in the access router 30a before the handover. Therefore, the access router 30a can prevent consumption of the storage capacity caused by storing wasteful information and effectively utilize the resources of the mobile communication system 100.

Further, the roaming terminal management device 20 notifies the address management device 10 of the result of the handover judgment. Therefore, it is possible for the address management device 10 as well to update the address translation information to the new address translation information after the handover, and at the same time, to delete the address translation information before the handover, which is no longer necessary. Therefore, it is possible for the address management device 10 as well to prevent the consumption of the storage capacity caused by storing wasteful information and to effectively utilize the resources.

Furthermore, the management device 40 makes an identifier duplication judgment for judging whether or not the unique identifier and the existing unique identifier of the existing terminal connecting to other access router are the same, and notifies the access router 30b of the result of the identifier duplication judgment. Then, the access router 30b assigns a routing address when the unique identifier is different from the existing unique identifier. This allows the management device 40 not to assign the routing address to the MIP terminal 50a in the mobile communication system 100 when it is not possible to uniquely identify the MIP terminal 50a using the unique identifier. Then, it is possible for the management device 40 to detect the handover using the unique identifier and to appropriately instruct to delete the address translation information based on the result of the handover judgment.

(Modification Examples)

Although the inventions have been described above by reference to certain embodiments of the inventions, the inventions are not limited to the embodiments described above. Modifications and variations of the embodiments described above will occur to those skilled in the art, in light of the above teachings. For example, as shown in FIG. 13 and FIG. 20, in detecting the handover, when the address management device 10 instructs the access router 30b being a handover destination access router, and the access router 30c to which the corresponding terminal 50b connects to register the new address translation information, the address management unit 14 may instruct to register transient address translation information having the previous user address "UA1" and the new routing address "RA5" associated, in addition to the address translation information in which the new care-of address "UA5" in the handover destination access router and the routing address "RA5" assigned thereto are associated.

For example, using the multiple notification option 3*a*, the address management unit 14 sets the previous user address "UA1" used by the MIP terminal 50*a* while in connection to the access router 30*a* to the field of the additional user address, the new routing address "RA5" to the field of the additional routing address, "Register" to the field of the additional message type, and "Valid term T" to the field of the option information of the multiple notification option 3*a*, thereby to generate the register/delete request message 3 including the transient address translation information, and to instruct to register it. In this manner, the address management unit 14, when having detected the handover, functions as a register instruction unit configured to instruct the access router to register the correspondence (hereinafter, referred to as a "transition correspondence") between the transient address (hereinafter, referred to as a "previous transient address) used by the MIP terminal 50*a* while in connection to other access router and the routing address.

By the way, the valid term T of the transient address translation information, which is shorter than that of the normal address translation information, is set. According to the register/delete request message 3, with the valid term of the transient address translation information, the translation information management unit 34 of the access routers 30*b* and 30*c* sets the "Valid term T" specified by the multiple notification option 3*a*, which is shorter than that of the new address translation information, and registers it in the translation information table 32.

According to this, in the mobile communication system 100, the access router can store the transient address translation information (transition correspondence). Therefore, even if the user data packet destined for the previous user address "UA1" (destined for the previous transient address), which has been transmitted immediately after the handover, remains in the mobile communication system 100, it is possible for the access routers 30*b* and 30*c* to appropriately transfer the user data packet to the MIP terminal 50*a* using the routing address "RA5" currently assigned to the MIP terminal 50*a*. Due to this, the packet loss of the user data packet can be suppressed and the resources in the mobile communication system 100 can be effectively utilized. Further, the valid term of the transient address translation information expires shortly and is deleted from the translation information table 32. Therefore, after the new care-of address "UA5" of the MIP terminal 50*a*, which has changed through the handover, allows the user data packet to be transmitted and received, the transient address translation information, which is no longer necessary, can be prevented from being stored.

Additionally, the address management device 10 may omit the instruction for deleting the address translation information before a handover, which is given to the access router 30*a* at the time of detecting the handover, because it is possible for the access routers 30*a* to 30*c* to delete the address translation information also when the valid term expires, although the address translation information will be stored until the valid term expires. Further, in the mobile communication system 100 shown in FIG. 3, the address management device 10 and the roaming terminal management device 20 physically separated from each other cooperate to function as the management device 40, but a physically single management device having the functions of the address management device 10 and the roaming terminal management device 20 may be provided.

Furthermore, the mobile communication system 100 may include a communication state management database configured to store communication states between communication terminals. The communication state management database stores the communication state for each terminal correspondingly with its correspondent. Such a communication state management database may be provided to the address management device 10, or may be provided separately from the address management device 10. In this case, it is possible for the address management unit 14 to refer to the communication state management database when instructing the access router 30*a* before the handover to delete the address translation information. Then, the address management unit 14 may judge whether or not the communication terminal in communication with the corresponding terminal 50*b* being a correspondent of the MIP terminal 50*a* that has carried out a handover, exists in subordination to the access router 30*a*. When no communication terminal in communication with the corresponding terminal 50*b* exists in subordination to the access router 30*a*, the address management unit 14 instructs the access router 30*a* to delete the address translation information about the corresponding terminal 50*b*.

What it claimed is:

1. A mobile communication system comprising: a management device; and
  a plurality of access routers connected to the management device, wherein the management device comprises:
  a management unit configured to manage a management table storing a unique identifier of a mobile terminal, a care-of address and a routing address as being associated with one another, the care-of address includes a value unique to a connecting access router which is an access router to which the mobile terminal connects, and is included in the plurality of access routers, the routing address is assigned by the connecting access router; and
  a judgment unit configured to judge whether or not an acquired unique identifier is already stored in the management table, the acquired unique identifier is a unique identifier of the mobile terminal and is acquired via one access router included in the plurality of access routers, wherein
  the management unit management unit newly registers a care-of address including the value unique to the one access router and a routing address assigned by the one access router in the management table, when the acquired unique identifier is not stored in the management tables, and
  when the acquired unique identifier is stored in the management table, the judgment unit requests information from the plurality of access routers other than the one access router to make a determination of whether a routing address is assigned to the mobile terminal in one of the plurality of access routers other than the one access router or whether the acquired unique identifier exists as an identifier of another mobile terminal in one of the plurality of access routers other than the one access router, and inputs the determination to the management unit, and the management unit notifies the plurality of access routers of the determination.

2. A management device comprising:
  an interface connected to a plurality of access routers;
  a management unit configured to manage a management table storing a unique identifier of a mobile terminal, a care-of address and a routing address as being associated with one another, the care-of address includes a value unique to a connecting access router which is an access router to which the mobile terminal connects, and is included in the plurality of access routers, the routing address is assigned by the connecting access router; and
  a judgment unit configured to judge whether or not an acquired unique identifier is already stored in the management table, the acquired unique identifier is a unique identifier of the mobile terminal and is acquired via one access router included in the plurality of access routers, wherein the management unit newly registers a care-of address including the value unique to the one access router and a routing address assigned by the one access router in the management table, when the acquired unique identifier is not stored in the management tables, and when the acquired unique identifier is stored in the management table, the judgment unit reciuests information from the plurality of access routers other than the one access router to make a determination of whether a routing address is assigned to the mobile terminal in one of the plurality of access routers other than the one access router or whether the acquired unique identifier exists as an identifier of another mobile terminal in one of the plurality of access routers other than the one access router, and inputs the determination to the management unit, and the management unit notifies the plurality of access routers of the determination.

3. The management device according to claim 2, wherein when the acquired unique identifier is stored in the management table and is associated with an access router among the plurality of access routers other than the one access router, the management unit notifies the access router among the plurality of access routers other than the one access router to delete an association with the mobile terminal.

4. The management device according to claim 2, wherein the one access router registers a translation the care-of address of the mobile terminal from an access router among the plurality of access routers other than the one access router to the one access router, when the acquired unique identifier is stored in the management table and is associated with the access router among the plurality of access routers other than the one access router.

5. The management device according to claim 2, further comprising:
an address resolution unit configured to acquire, from the management table, a routing address associated with a care-of address submitted with a request from an access router, in accordance with the request from the access router.

6. A mobile communication method comprising:
managing, at a management device connected to a plurality of access routers, a management table storing a unique identifier of a mobile terminal, a care-of address and a routing address as being associated with one another;
judging, at the management device, whether or not an acquired unique identifier is already stored in the management table, the acquired unique identifier being a unique identifier of the mobile terminal and being acquired via one access router included in the plurality of access routers, wherein
newly registering a care-of address including the value unique to the one access router and a routing address assigned by the one access router in the management table, when the acquired unique identifier is not stored in the management table, and
requesting, at the management device, information from the plurality of access routers other than the one access router to make a determination of whether a routing address is assigned to the mobile terminal in one of the plurality of access routers other than the one access router or whether the acquired unique identifier exists as an identifier of another mobile terminal in one of the plurality of access routers other than the one access router, and notifying the plurality of access routers of the determination, wherein
the care-of address includes a value unique to a connecting access router which is an access router to which the mobile terminal connects, and is included in the plurality of access routers, the routing address is assigned by the connecting access router.

* * * * *